United States Patent
Germain et al.

(10) Patent No.: US 7,365,621 B2
(45) Date of Patent: Apr. 29, 2008

(54) PIVOT POINT RESET LOCKOUT MECHANISM FOR A GROUND FAULT CIRCUIT INTERRUPTER

(75) Inventors: Frantz Germain, Rosedale, NY (US); Stephen Stewart, Uniondale, NY (US); Roger M. Bradley, North Bellmore, NY (US); Nicholas L. Disalvo, Levittown, NY (US); William R. Ziegler, East Northport, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 460 days.

(21) Appl. No.: 10/909,610

(22) Filed: Aug. 2, 2004

(65) Prior Publication Data

US 2005/0002138 A1    Jan. 6, 2005

Related U.S. Application Data

(63) Continuation of application No. 09/813,412, filed on Mar. 21, 2001, now Pat. No. 6,771,152, which is a continuation-in-part of application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967, application No. 10/909,610, which is a continuation-in-part of application No. 09/688,481, filed on Oct. 16, 2000, now Pat. No. 6,437,700.

(51) Int. Cl.
*H01H 73/00*    (2006.01)

(52) U.S. Cl. .......................................... 335/18; 361/42

(58) Field of Classification Search .................. 335/18; 361/42–50
See application file for complete search history.

(56) References Cited

U.S. PATENT DOCUMENTS

| | | | |
|---|---|---|---|
| 3,309,571 | A | 3/1967 | Gilker |
| 3,538,477 | A | 11/1970 | Walters et al. |
| 3,702,418 | A | 11/1972 | Obenhaus |
| 3,731,154 | A | 5/1973 | Torosian |
| 3,766,434 | A | 10/1973 | Sherman |
| 3,813,579 | A | 5/1974 | Doyle |
| 3,864,649 | A | 2/1975 | Doyle |
| 3,872,354 | A | 3/1975 | Niestor et al. |
| 3,949,336 | A | 4/1976 | Dietz |
| 4,002,951 | A | 1/1977 | Halbeck |
| 4,010,431 | A | 3/1977 | Virani |
| 4,034,266 | A * | 7/1977 | Virani et al. .................. 361/42 |
| 4,034,360 | A | 7/1977 | Schweitzer, Jr. |
| 4,051,544 | A | 9/1977 | Vibert |
| 4,063,299 | A | 12/1977 | Munroe |

(Continued)

FOREIGN PATENT DOCUMENTS

AU    759587    7/2003

(Continued)

*Primary Examiner*—K. Lee
*Assistant Examiner*—Bernard Rojas
(74) *Attorney, Agent, or Firm*—Paul J. Sutton

(57) ABSTRACT

Resettable circuit interrupting devices, such as GFCI devices that include a reset lockout mechanism are provided. The GFCI comprises a reset button which is selectively blocked from resetting the GFCI.

4 Claims, 24 Drawing Sheets

U.S. PATENT DOCUMENTS

| | | |
|---|---|---|
| 4,086,549 A | 4/1978 | Slater et al. |
| 4,109,226 A | 8/1978 | Bowling |
| 4,114,123 A | 9/1978 | Grenier |
| 4,159,499 A | 6/1979 | Bereskin |
| 4,223,365 A | 9/1980 | Moran |
| 4,237,435 A | 12/1980 | Cooper et al. |
| 4,316,230 A | 2/1982 | Hansen |
| 4,377,837 A | 3/1983 | Matsko |
| 4,386,338 A | 5/1983 | Doyle |
| 4,409,574 A | 10/1983 | Misencik |
| 4,412,193 A | 10/1983 | Bienwald |
| 4,442,470 A | 4/1984 | Misencik |
| 4,518,945 A | 5/1985 | Doyle |
| 4,521,824 A | 6/1985 | Morris et al. |
| 4,538,040 A | 8/1985 | Ronemus |
| 4,567,456 A | 1/1986 | Legatti |
| 4,574,260 A | 3/1986 | Franks |
| 4,578,732 A | 3/1986 | Draper et al. |
| 4,587,588 A | 5/1986 | Goldstein |
| 4,595,894 A | 6/1986 | Doyle et al. |
| 4,630,015 A | 12/1986 | Gernhardt et al. |
| 4,631,624 A | 12/1986 | Dorak et al. |
| 4,719,437 A | 1/1988 | Yun |
| 4,802,052 A | 1/1989 | Brant et al. |
| 4,814,641 A | 3/1989 | Dufresne |
| 4,851,951 A | 7/1989 | Foster, Jr. |
| 4,901,183 A | 2/1990 | Lee |
| 4,967,308 A | 10/1990 | Morse |
| 4,979,070 A | 12/1990 | Bodkin |
| 5,144,516 A | 9/1992 | Sham |
| 5,148,344 A | 9/1992 | Rao et al. |
| 5,185,687 A | 2/1993 | Beihoff et al. |
| 5,202,662 A | 4/1993 | Bienwald et al. |
| 5,223,810 A | 6/1993 | Van Haaren |
| 5,224,006 A | 6/1993 | MacKenzie et al. |
| 5,229,730 A | 7/1993 | Legatti et al. |
| 5,239,438 A | 8/1993 | Echtler |
| 5,347,248 A | 9/1994 | Herbert |
| 5,363,269 A | 11/1994 | McDonals |
| 5,418,678 A | 5/1995 | McDonald |
| 5,448,443 A | 9/1995 | Muelleman |
| 5,477,412 A | 12/1995 | Neiger et al. |
| 5,510,760 A | 4/1996 | Marcou et al. |
| 5,515,218 A | 5/1996 | DeHaven |
| 5,517,165 A | 5/1996 | Cook |
| 5,541,800 A | 7/1996 | Misencik |
| 5,555,150 A | 9/1996 | Newman |
| 5,594,398 A | 1/1997 | Marcou et al. |
| 5,600,524 A | 2/1997 | Neiger et al. |
| 5,617,284 A | 4/1997 | Paradise |
| 5,625,285 A | 4/1997 | Virgilo et al. |
| 5,628,394 A | 5/1997 | Benke et al. |
| 5,631,798 A | 5/1997 | Seymour et al. |
| 5,637,000 A | 6/1997 | Ostrenbrock et al. |
| 5,654,857 A | 8/1997 | Gershen |
| 5,655,648 A | 8/1997 | Rosen et al. |
| 5,661,623 A | 8/1997 | McDonald et al. |
| 5,665,648 A | 9/1997 | Little |
| 5,680,287 A | 10/1997 | Gernhardt |
| 5,694,280 A | 12/1997 | Zhou |
| 5,706,155 A | 1/1998 | Neiger et al. |
| 5,715,125 A | 2/1998 | Neiger |
| 5,719,363 A | 2/1998 | Handler |
| 5,729,417 A | 3/1998 | Neiger et al. |
| 5,805,397 A | 9/1998 | MacKenzie |
| 5,815,363 A | 9/1998 | Chu |
| 5,825,602 A | 10/1998 | Tosaka et al. |
| 5,844,765 A | 12/1998 | Kato et al. |
| 5,847,913 A | 12/1998 | Turner et al. |
| 5,849,878 A * | 12/1998 | Cantor et al. ............ 530/391.9 |
| 5,875,087 A | 2/1999 | Spencer et al. |
| 5,917,686 A | 6/1999 | Chan |
| 5,933,063 A | 8/1999 | Keung et al. |
| 5,943,198 A | 8/1999 | Hirsh et al. |
| 5,943,199 A | 8/1999 | Aromin |
| 5,956,218 A | 9/1999 | Berthold |
| 5,963,408 A | 10/1999 | Neiger et al. |
| 6,021,034 A | 2/2000 | Chan |
| 6,040,967 A | 3/2000 | DiSalvo et al. |
| 6,052,265 A | 4/2000 | Zaretsky et al. |
| 6,180,899 B1 | 1/2001 | Passow |
| 6,226,161 B1 | 5/2001 | Neiger et al. |
| 6,246,558 B1 | 6/2001 | DiSalvo et al. |
| 6,252,407 B1 | 6/2001 | Gershen |
| 6,282,070 B1 | 8/2001 | Ziegler et al. |
| 6,288,882 B1 | 9/2001 | DiSalvo et al. |
| 6,309,248 B1 | 10/2001 | King |
| 6,324,043 B1 | 11/2001 | Turner |
| 6,381,112 B1 | 4/2002 | DiSalvo et al. |
| 6,381,113 B1 | 4/2002 | Legatti |
| 6,437,700 B1 | 8/2002 | Herzfeld et al. |
| 6,437,953 B2 | 8/2002 | DiSalvo et al. |
| D462,660 S | 9/2002 | Huang et al. |
| 6,558,928 B1 * | 5/2003 | Landegren ............... 435/91.1 |
| 6,580,344 B2 | 6/2003 | Li |
| 6,590,172 B1 | 7/2003 | Gadre et al. |
| 6,590,753 B1 | 7/2003 | Finlay |
| 6,621,388 B1 | 9/2003 | Macbeth |
| 6,628,486 B1 | 9/2003 | Macbeth |
| 6,646,838 B2 | 11/2003 | Ziegler et al. |
| 6,657,834 B2 | 12/2003 | DiSalvo |
| 6,671,145 B2 | 12/2003 | Germain et al. |
| 6,693,779 B2 | 2/2004 | DiSalvo |
| 6,717,782 B2 | 4/2004 | DiSalvo et al. |
| 6,771,152 B2 | 8/2004 | Germain et al. |
| 6,813,126 B2 | 11/2004 | DiSalvo et al. |
| 6,828,886 B2 | 12/2004 | Germain |
| 6,842,095 B2 | 1/2005 | Macbeth |
| 6,864,763 B2 | 3/2005 | Germain et al. |
| 6,864,766 B2 | 3/2005 | DiSalvo et al. |
| 6,864,769 B2 | 3/2005 | Germain et al. |
| 6,900,972 B1 | 5/2005 | Chan |
| 6,937,451 B2 | 8/2005 | Ulrich |
| 6,944,001 B2 | 9/2005 | Ziegler et al. |
| 6,975,192 B2 | 12/2005 | DiSalvo |
| 6,975,492 B2 | 12/2005 | DiSalvo |
| 6,982,856 B2 | 1/2006 | Bernstein |
| 6,998,856 B2 | 2/2006 | Huadao |
| 6,998,945 B2 | 2/2006 | Huang |
| 7,031,125 B2 | 4/2006 | Germain |
| 7,042,688 B2 | 5/2006 | Chan |
| 7,049,910 B2 | 5/2006 | Campolo |
| 7,082,021 B2 | 7/2006 | Chan |
| 7,098,761 B2 | 8/2006 | Germain |
| 7,177,126 B2 | 2/2007 | Ulrich et al. |
| 7,209,330 B2 | 4/2007 | DiSalvo |
| 2002/0064779 A1 * | 5/2002 | Landegren et al. ............ 435/6 |
| 2003/0085783 A1 | 5/2003 | Macbeth |
| 2003/0151478 A1 | 8/2003 | Radosavljevic et al. |
| 2005/0012575 A1 | 1/2005 | Huang et al. |

FOREIGN PATENT DOCUMENTS

| | | |
|---|---|---|
| CA | 2425810 | 4/2007 |
| EP | 0 526 071 A | 2/1993 |
| ES | 21345 8/77 | 5/1978 |
| GB | 227930 | 1/1925 |
| GB | 830018 | 3/1960 |
| GB | 2207823 | 2/1989 |
| GB | 2290181 A | 12/1995 |
| GB | 2292491 | 2/1996 |
| JP | 61-259428 | 11/1986 |
| WO | WO 96/01484 A | 1/1996 |
| WO | WO96/01484 A | 1/1996 |

| | | | | | |
|---|---|---|---|---|---|
| WO | PCT/US99/19319 | 3/2000 | WO | WO 2004/070752 | 8/2004 |
| WO | PCT/US00/22955 | 3/2001 | | | |
| WO | PCT/US01/32562 | 4/2002 | | | |
| WO | WO 2004/070751 | 8/2004 | | | |

* cited by examiner

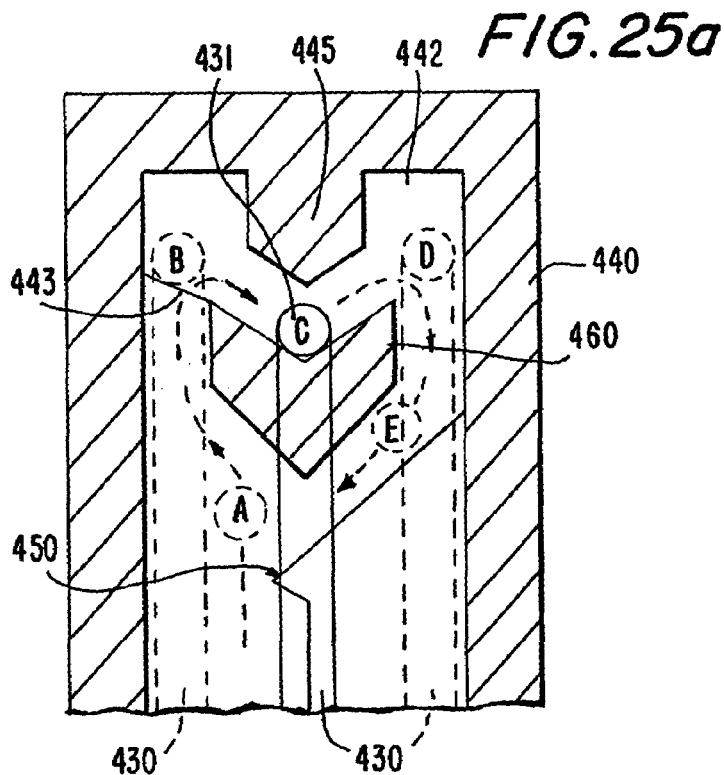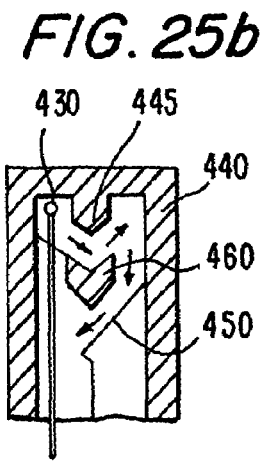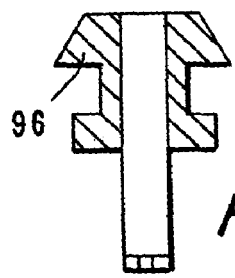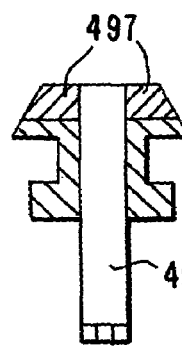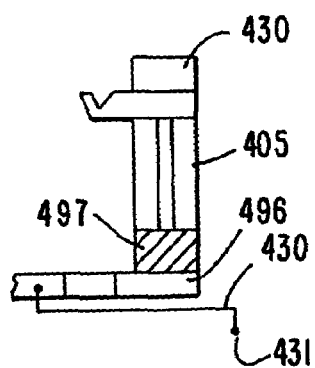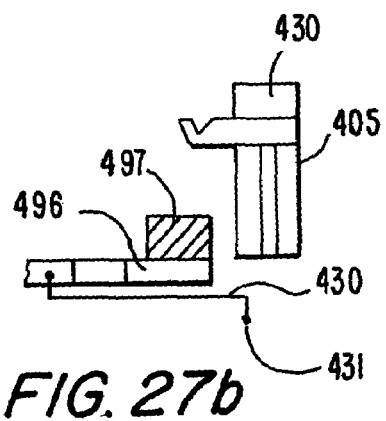
FIG. 25a
FIG. 25b
FIG. 26a
FIG. 26b
FIG. 27a
FIG. 27b

PIVOT POINT RESET LOCKOUT MECHANISM FOR A GROUND FAULT CIRCUIT INTERRUPTER

This application is a continuation of U.S. application Ser. No. 09/813,412, filed Mar. 21, 2001 now U.S. Pat. No. 6,771,152.

This application is related to commonly owned application Ser. No. 09/812,288, filed Mar. 20, 2001, now U.S. Pat. No. 7,049,910, which is a continuation-in-part of application Ser. No. 09/379,138 filed Aug. 20, 1999 now U.S. Pat. No. 6,246,558, which is a continuation-in-part of application Ser. No. 09/369,759 filed Aug. 6, 1999 now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/812,875, filed Mar. 20, 2001, now U.S. Pat. No. 7,031,125, which is a continuation-in-part of application Ser. No. 09/688,481 filed Oct. 16, 2000, now U.S. Pat. No. 6,437,700, all of which are incorporated herein in their entirety by reference.

This application is related to commonly owned application Ser. No. 09/812,624, filed Mar. 20, 2001, now U.S. Pat. No. 6,671,145, herein incorporated by reference.

This application is related to commonly owned application Ser. No. 09/379,140 filed Aug. 20, 1999, now U.S. Pat. No. 6,288,882, which is a continuation-in-part of application Ser. No. 09/369,759 filed Aug. 6, 1999, now U.S. Pat. No. 6,282,070, which is a continuation-in-part of application Ser. No. 09/138,955, filed Aug. 24, 1998, now U.S. Pat. No. 6,040,967, all of which are incorporated herein in their entirety by reference.

This application is related to commonly owned application Ser. No. 09/813,683, filed Mar. 21, 2001, now U.S. Pat. No. 6,693,779, which is incorporated herein in its entirety by reference.

BACKGROUND

1. Field

The present application is directed to resettable circuit interrupting devices including without limitation ground fault circuit interrupters (GFCI's). Certain embodiments of the present application are directed to circuit interrupting devices including a reset lock out portion capable of preventing the device from resetting in certain circumstances.

2. Description of the Related Art

Presently available GFCI devices, such as the device described in commonly owned U.S. Pat. No. 4,595,894, use an electrically activated trip mechanism to mechanically break an electrical connection between the line side and the load side of a GFCI. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

Commonly owned application Ser. No. 09/138,955, filed Aug. 24, 1998, now U.S. Pat. No. 6,040,967, which is incorporated herein in its entirety by reference, describes a family of resettable circuit interrupting devices capable of locking out the reset portion of the device if the circuit interrupting portion is non-operational or if an open neutral condition exists.

Some of the circuit interrupting devices described above have a user accessible load side connection in addition to the line and load side connections. The user accessible load side connection includes one or more connection points where a user can externally connect to electrical power supplied from the line side. The load side connection and user accessible load side connection are typically electrically connected together. An example of such a circuit interrupting device is a GFCI receptacle, where the line and load side connections are binding screws and the user accessible load side connection is the plug connection to an internal receptacle. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains.

SUMMARY

The present application relates to a resettable circuit interrupting devices that maintain fault protection for the circuit interrupting device even if the device is reverse wired.

In one embodiment, the circuit interrupting device includes a housing and phase and neutral conductive paths disposed at least partially within the housing between line and load sides. Preferably, the phase conductive path terminates at a first connection capable of being electrically connected to a source of electricity, a second connection capable of conducting electricity to at least one load and a third connection capable of conducting electricity to at least one user accessible load. Similarly, the neutral conductive path, preferably, terminates at a first connection capable of being electrically connected to a source of electricity, a second connection capable of providing a neutral connection to the at least one load and a third connection capable of providing a neutral connection to the at least one user accessible load;

The circuit interrupting device also includes a circuit interrupting portion that is disposed within the housing and configured to cause electrical discontinuity in one or both of the phase and neutral conductive paths, between said line side and said load side upon the occurrence of a predetermined condition. A reset portion is disposed at least partially within the housing and is configured to reestablish electrical continuity in the open conductive paths.

Preferably, the phase conductive path includes a plurality of contacts that are capable of opening to cause electrical discontinuity in the phase conductive path and closing to reestablish electrical continuity in the phase conductive path, between said line and load sides. The neutral conductive path also includes a plurality of contacts that are capable of opening to cause electrical discontinuity in the neutral conductive path and closing to reestablish electrical continuity in the neutral conductive path, between said line and load sides. In this configuration, the circuit interrupting portion causes the plurality of contacts of the phase and neutral conductive paths to open, and the reset portion causes the plurality of contacts of the phase and neutral conductive paths to close.

One embodiment for the circuit interrupting portion uses an electromechanical circuit interrupter to cause electrical discontinuity in the phase and neutral conductive paths, and sensing circuitry to sense the occurrence of the predetermined condition. For example, the electromechanical circuit interrupter include a coil assembly, a movable plunger attached to the coil assembly and a banger attached to the plunger. The movable plunger is responsive to energizing of the coil assembly, and movement of the plunger is translated to movement of said banger. Movement of the banger causes the electrical discontinuity in the phase and/or neutral conductive paths.

The circuit interrupting device may also include reset lockout portion that prevents the reestablishing of electrical continuity in either the phase or neutral conductive path or both conductive paths, unless the circuit interrupting portion is operating properly. That is, the reset lockout prevents resetting of the device unless the circuit interrupting portion is operating properly. In embodiments where the circuit interrupting device includes a reset lockout portion, the reset portion may be configured so that at least one reset contact is electrically connected to the sensing circuitry of the circuit interrupting portion, and that depression of a reset button causes at least a portion of the phase conductive path to contact at least one reset contact. When contact is made between the phase conductive path and the at least one reset contact, the circuit interrupting portion is activated so that the reset lockout portion is disabled and electrical continuity in the phase and neutral conductive paths can be reestablished.

The circuit interrupting device may also include a trip portion that operates independently of the circuit interrupting portion. The trip portion is disposed at least partially within the housing and is configured to cause electrical discontinuity in the phase and/or neutral conductive paths independent of the operation of the circuit interrupting portion. In one embodiment, the trip portion includes a trip actuator accessible from an exterior of the housing and a trip arm preferably within the housing and extending from the trip actuator. The trip arm is preferably configured to facilitate mechanical breaking of electrical continuity in the phase and/or neutral conductive paths, if the trip actuator is actuated. Preferably, the trip actuator is a button. However, other known actuators are also contemplated.

BRIEF DESCRIPTION OF THE DRAWINGS

Preferred embodiments of the present application are described herein with reference to the drawings in which similar elements are given similar reference characters, wherein:

FIGS. 25a–b are perspective sectional view of a reset lockout groove and reset lockout arm in different positions;

FIG. 26a is a sectional view of the banger from the device of FIG. 15;

FIG. 26b is a sectional view of the banger in accordance with the embodiment of the present invention shown in FIG. 24; and FIGS. 27a–b are perspective sectional view of a reset button and banger in accordance with the embodiment of the present invention shown in FIG. 24.

DETAILED DESCRIPTION OF EMBODIMENTS

Figure 1:
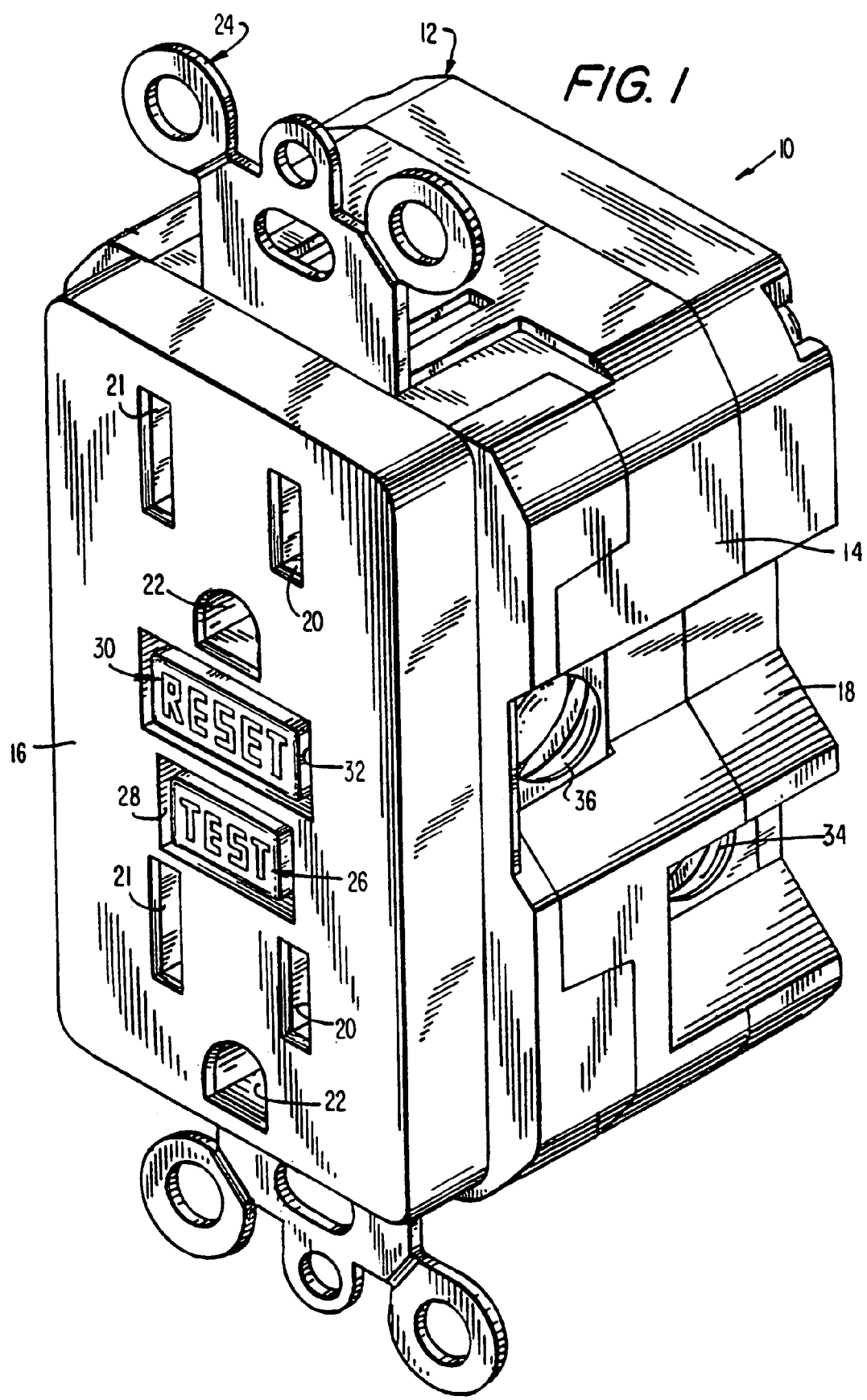
FIG. 1 is a perspective view of one embodiment of a ground fault circuit interrupting device according to the present application.

The present application contemplates various types of circuit interrupting devices that are capable of breaking at least one conductive path at both a line side and a load side of the device. The conductive path is typically divided between a line side that connects to supplied electrical power and a load side that connects to one or more loads. As noted, the various devices in the family of resettable circuit interrupting devices include: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI receptacle suitable for installation in a single-gang junction box used in, for example, a residential electrical wiring system. However, the mechanisms according to the present application can be included in any of the various devices in the family of resettable circuit interrupting devices.

The GFCI receptacles described herein have line and load phase (or power) connections, line and load neutral connections and user accessible load phase and neutral connections. The connections permit external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections.

In one embodiment, the GFCI receptacle has a circuit interrupting portion, a reset portion and a reset lockout. This embodiment is shown in FIGS. 1–11. In another embodiment, the GFCI receptacle is similar to the embodiment of FIGS. 1–11, except the reset lockout is omitted. Thus, in this embodiment, the GFCI receptacle has a circuit interrupting portion and a reset portion, which is similar to those described in FIGS. 1–12. In another embodiment, the GFCI receptacle has a circuit interrupting portion, a reset portion, a reset lockout and an independent trip portion. This embodiment is shown in FIGS. 13–20.

The circuit interrupting and reset portions described herein preferably use electro-mechanical components to break (open) and make (close) one or more conductive paths between the line and load sides of the device. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load sides upon the detection of a fault, which in the embodiments described is a ground fault. The reset portion is used to close the open conductive paths.

In the embodiments including a reset lockout, the reset portion is used to disable the reset lockout, in addition to closing the open conductive paths. In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists and/or if the device is reverse wired.

In the embodiments including an independent trip portion, electrical continuity in one or more conductive paths can be broken independently of the operation of the circuit interrupting portion. Thus, in the event the circuit interrupting portion is not operating properly, the device can still be tripped.

The above-described features can be incorporated in any resettable circuit interrupting device, but for simplicity the descriptions herein are directed to GFCI receptacles.

Turning now to FIG. 1, the GFCI receptacle 10 has a housing 12 consisting of a relatively central body 14 to which a face or cover portion 16 and a rear portion 18 are removably secured. The face portion 16 has entry ports 20 and 21 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A test button 26 extends through opening 28 in the face portion 16 of the housing 12. The test button is used to activate a test operation, that tests the operation of the circuit interrupting portion (or circuit interrupter) disposed in the device. The circuit interrupting portion, to be described in more detail below, is used to break electrical continuity in one or more conductive paths between the line and load side of the device. A reset button 30 forming a part of the reset portion extends through opening 32 in the face portion 16 of the housing 12. The reset button is used to activate a reset operation, which reestablishes electrical continuity in the open conductive paths.

Electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the receptacle 10. These additional binding screws provide line and load neutral connections, respectively. A more detailed description of a GFCI receptacle is provided in U.S. Pat. No. 4,595,894, which is incorporated herein in its entirety by reference. It should also be noted that binding screws 34, 36, 38 and 40 are exemplary of the types of wiring terminals that can be used to provide the electrical connections. Examples of other types of wiring terminals include set screws, pressure clamps, pressure plates, push-in type connections, pigtails and quick-connect tabs.

Referring to FIGS. 2–6, the conductive path between the line phase connection 34 and the load phase connection 36 includes contact arm 50 which is movable between stressed and unstressed positions, movable contact 52 mounted to the contact arm 50, contact arm 54 secured to or monolithically formed into the load phase connection 36 and fixed contact 56 mounted to the contact arm 54. The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74. The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 2:
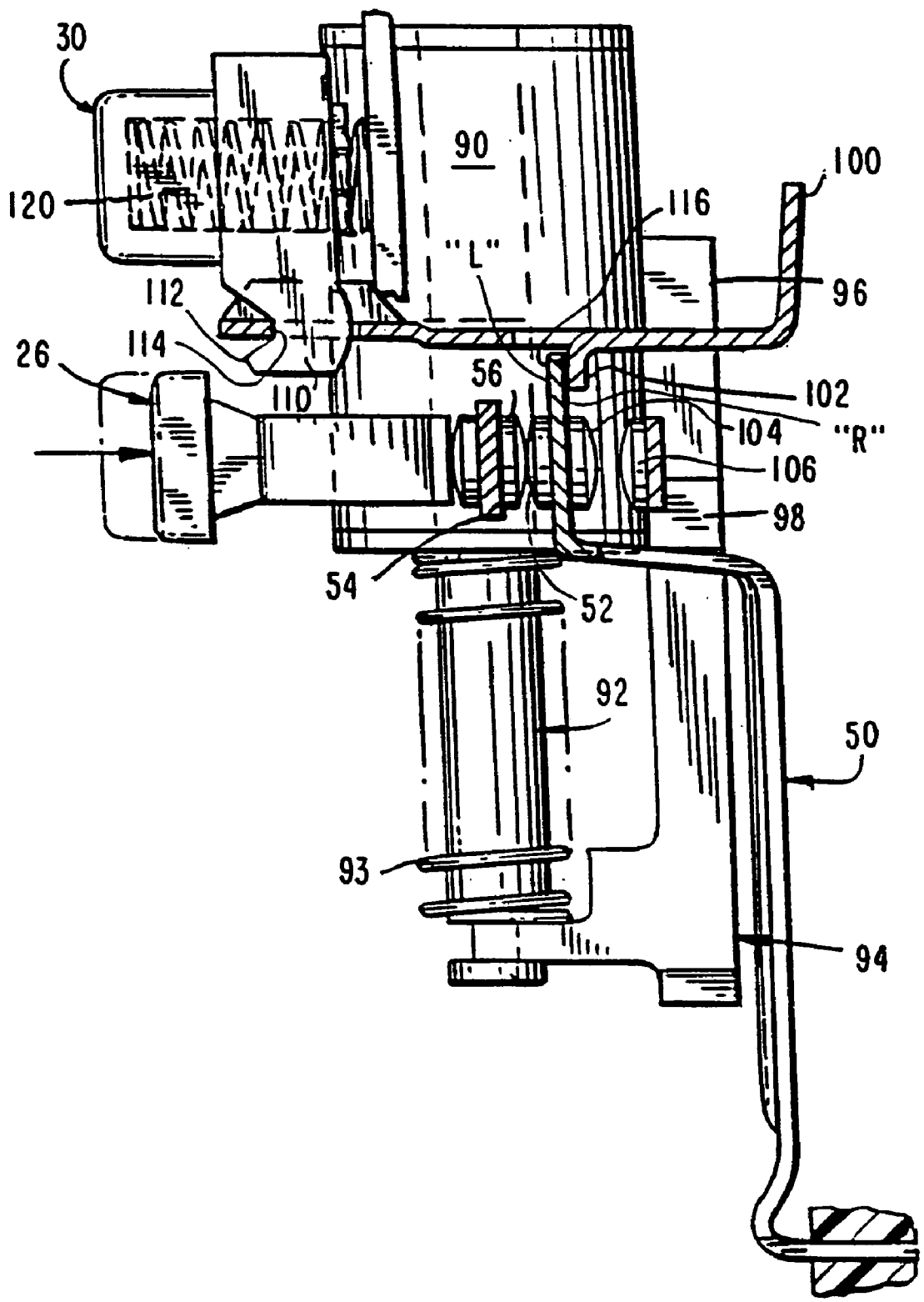
FIG. 2 is side elevational view, partly in section, of a portion of the GFCI device shown in FIG. 1, illustrating the GFCI device in a set or circuit making position.
Figure 12:
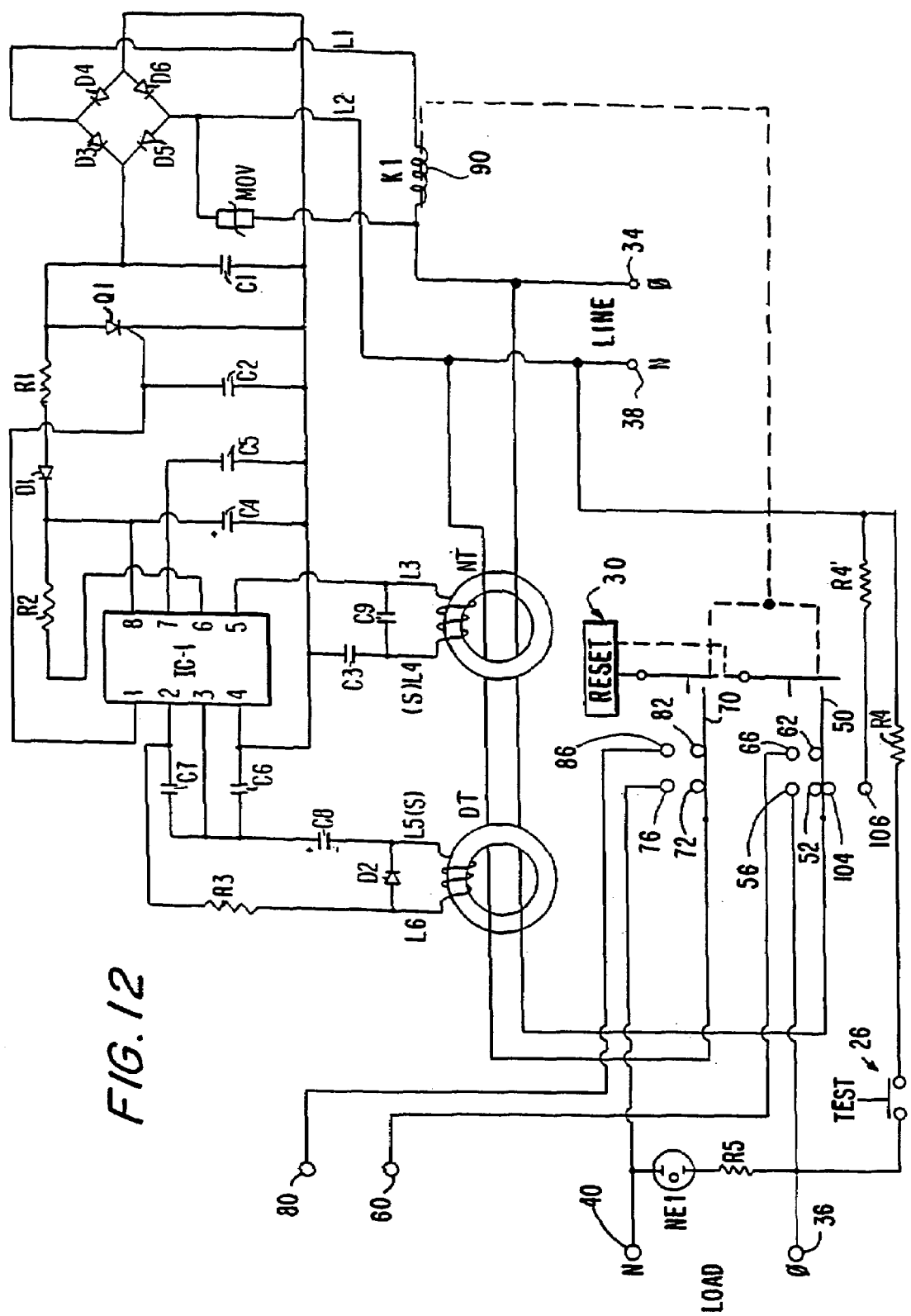
FIG. 12 is a schematic diagram of a circuit for detecting ground faults and resetting the GFCI device of FIG. 1.

Referring to FIG. 2, the circuit interrupting portion has a circuit interrupter and electronic circuitry capable of sensing faults, e.g., current imbalances, on the hot and/or neutral conductors. In a preferred embodiment for the GFCI receptacle, the circuit interrupter includes a coil assembly 90, a plunger 92 responsive to the energizing and de-energizing of the coil assembly and a banger 94 connected to the plunger 92. The banger 94 has a pair of banger dogs 96 and 98 which interact with a movable latching members 100 used to set and reset electrical continuity in one or more conductive paths. The coil assembly 90 is activated in response to the sensing of a ground fault by, for example, the sense circuitry shown in FIG. 12. FIG. 12 shows conventional circuitry for detecting ground faults that includes a differential transformer that senses current imbalances.

The reset portion includes reset button 30, the movable latching members 100 connected to the reset button 30, latching fingers 102 and reset contacts 104 and 106 that temporarily activate the circuit interrupting portion when the reset button is depressed, when in the tripped position. Preferably, the reset contacts 104 and 106 are normally open momentary contacts. The latching fingers 102 are used to engage side R of each contact arm 50,70 and move the arms 50,70 back to the stressed position where contacts 52,62 touch contacts 56,66, respectively, and where contacts 72,82 touch contacts 76,86, respectively.

The movable latching members 102 are, in this embodiment, common to each portion (i.e., the circuit interrupting, reset and reset lockout portions) and used to facilitate making, breaking or locking out of electrical continuity of one or more of the conductive paths. However, the circuit interrupting devices according to the present application also contemplate embodiments where there is no common mechanism or member between each portion or between certain portions. Further, the present application also contemplates using circuit interrupting devices that have circuit interrupting, reset and reset lockout portions to facilitate making, breaking or locking out of the electrical continuity of one or both of the phase or neutral conductive paths.

Figure 3:
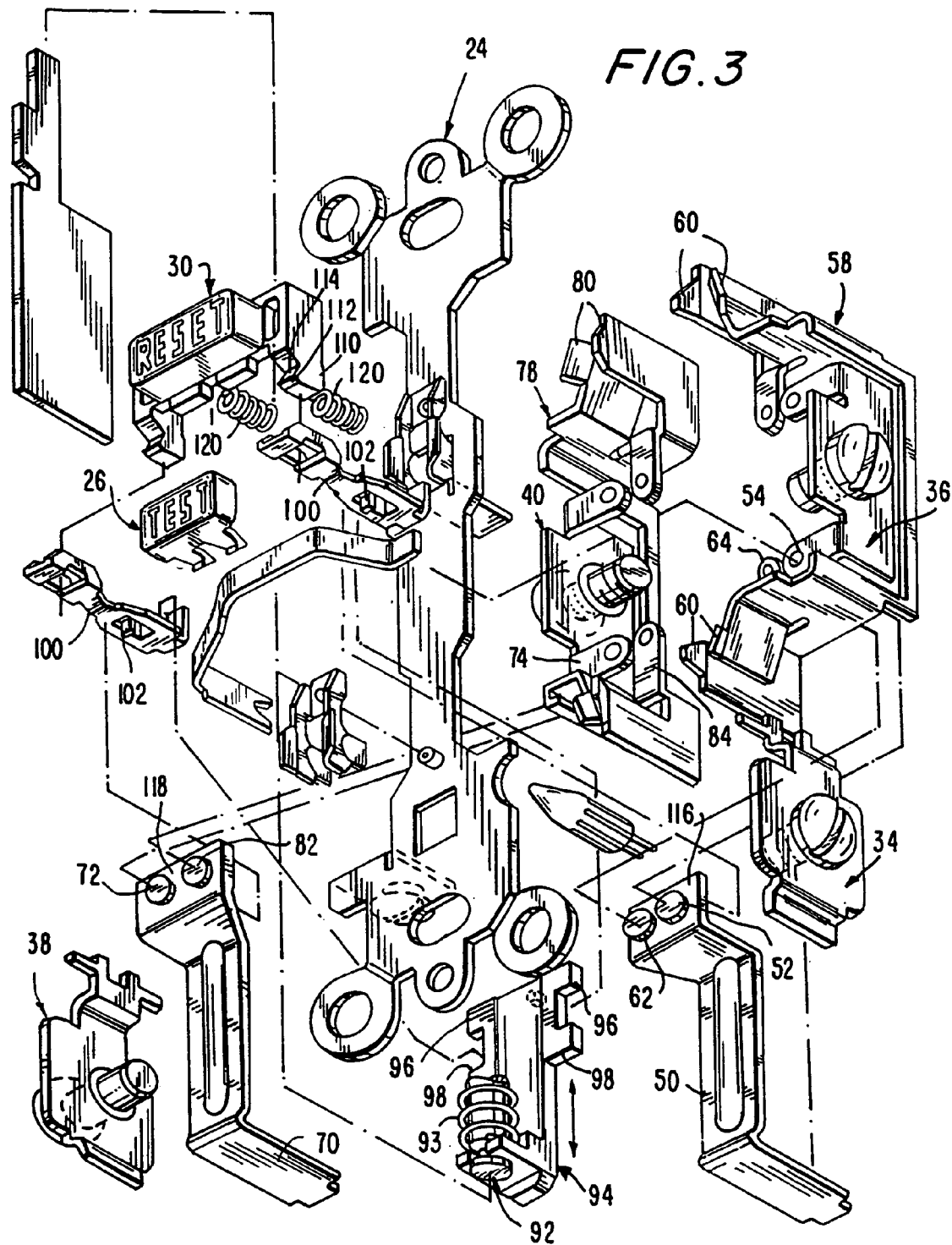
FIG. 3 is an exploded view of internal components of the circuit interrupting device of FIG. 1.

In the embodiment shown in FIGS. 2 and 3, the reset lockout portion includes latching fingers 102 which after the device is tripped, engages side L of the movable arms 50,70 so as to block the movable arms 50,70 from moving. By blocking movement of the movable arms 50,70, contacts 52 and 56, contacts 62 and 66, contacts 72 and 76 and contacts 82 and 86 are prevented from touching. Alternatively, only one of the movable arms 50 or 70 may be blocked so that their respective contacts are prevented from touching. Further, in this embodiment, latching fingers 102 act as an active inhibitor that prevents the contacts from touching. Alternatively, the natural bias of movable arms 50 and 70 can be used as a passive inhibitor that prevents the contacts from touching.

Referring now to FIGS. 2 and 7–11, the mechanical components of the circuit interrupting and reset portions in various stages of operation are shown. For this part of the description, the operation will be described only for the phase conductive path, but the operation is similar for the neutral conductive path, if it is desired to open and close both conductive paths. In FIG. 2, the GFCI receptacle is shown in a set position where movable contact arm 50 is in a stressed condition so that movable contact 52 is in electrical engagement with fixed contact 56 of contact arm 54. If the sensing circuitry of the GFCI receptacle senses a ground fault, the coil assembly 90 is energized to draw plunger 92 into the coil assembly 90 so that banger 94 moves upwardly. As the banger moves upwardly, the banger front dog 98 strikes the latch member 100 causing it to pivot in a counterclockwise direction C (seen in FIG. 7) about the joint created by the top edge 112 and inner surface 114 of finger 110. The movement of the latch member 100 removes the latching finger 102 from engagement with side R of the remote end 116 of the movable contact arm 50, and permits the contact arm 50 to return to its pre-stressed condition opening contacts 52 and 56, seen in FIG. 7.

Figure 10:
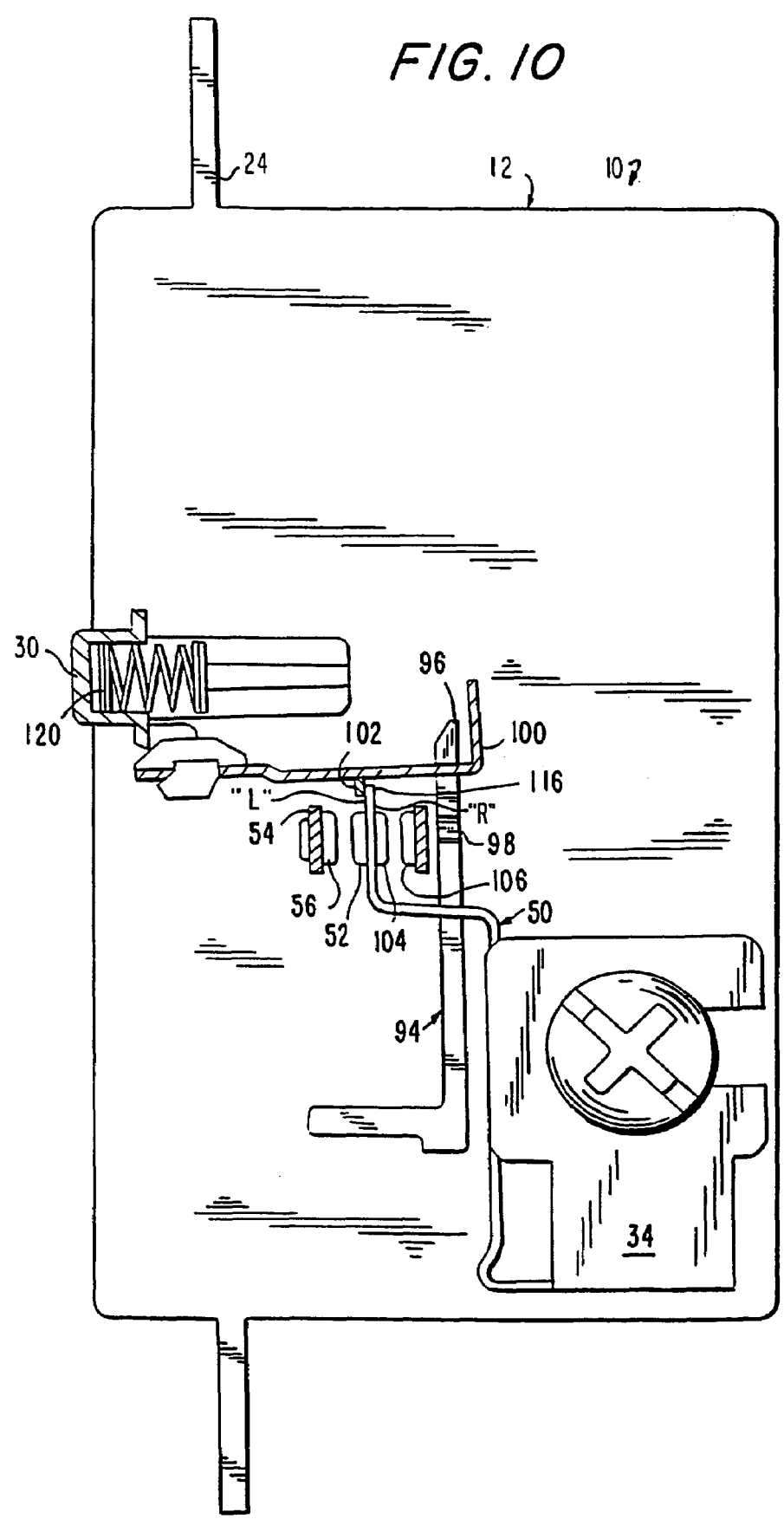

After tripping, the coil assembly 90 is de-energized so that spring 93 returns plunger 92 to its original extended position and banger 94 moves to its original position releasing latch member 100. At this time, the latch member 100 is in a lockout position where latch finger 102 inhibits movable contact 52 from engaging fixed contact 56, as seen in FIG. 10. As noted, one or both latching fingers 102 can act as an active inhibitor that prevents the contacts from touching. Alternatively, the natural bias of movable arms 50 and 70 can be used as a passive inhibitor that prevents the contacts from touching.

Figure 7:
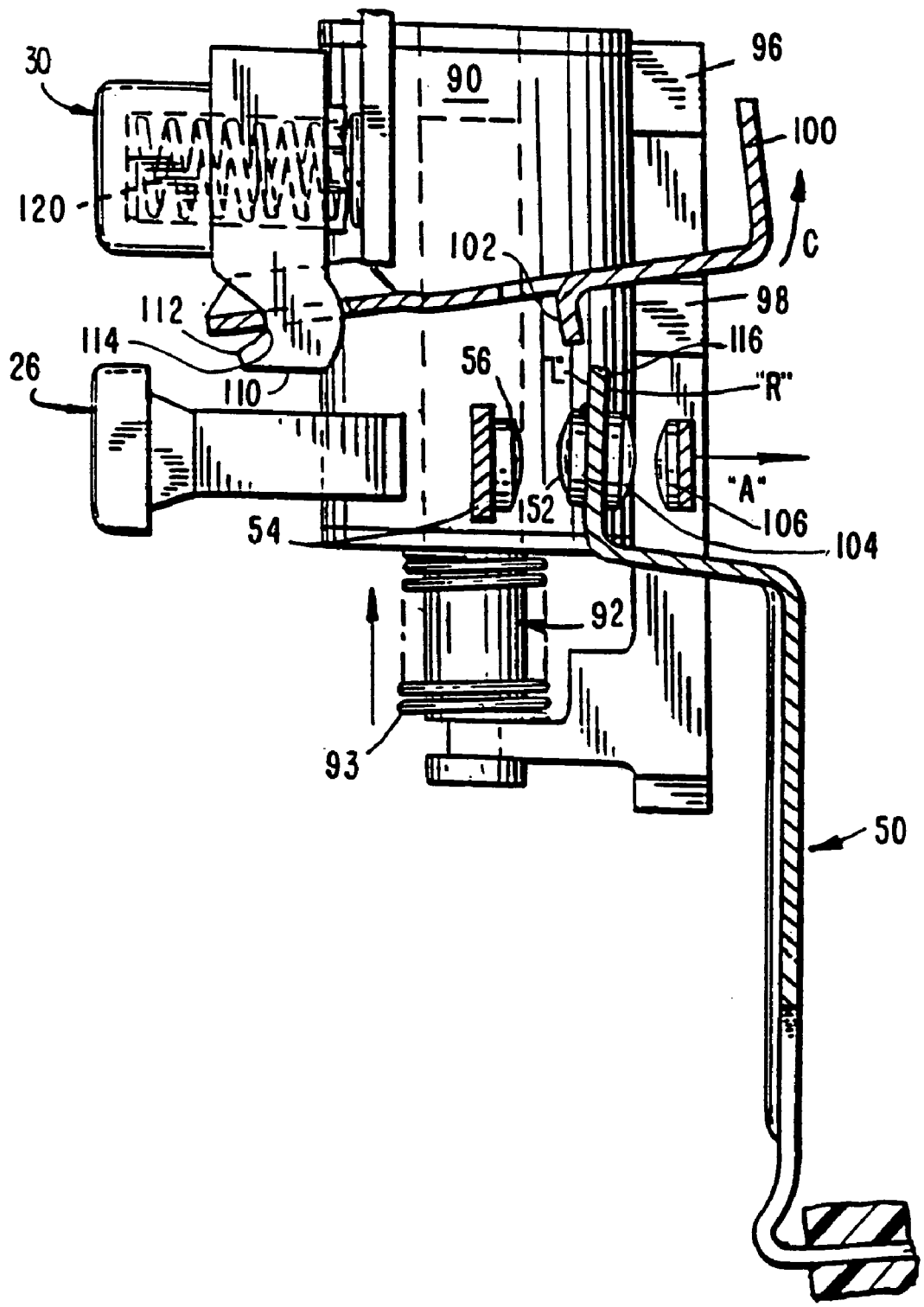
FIG. 7 is a side elevational view similar to FIG. 2, illustrating the GFCI device in a circuit breaking or interrupting position.
Figure 8:
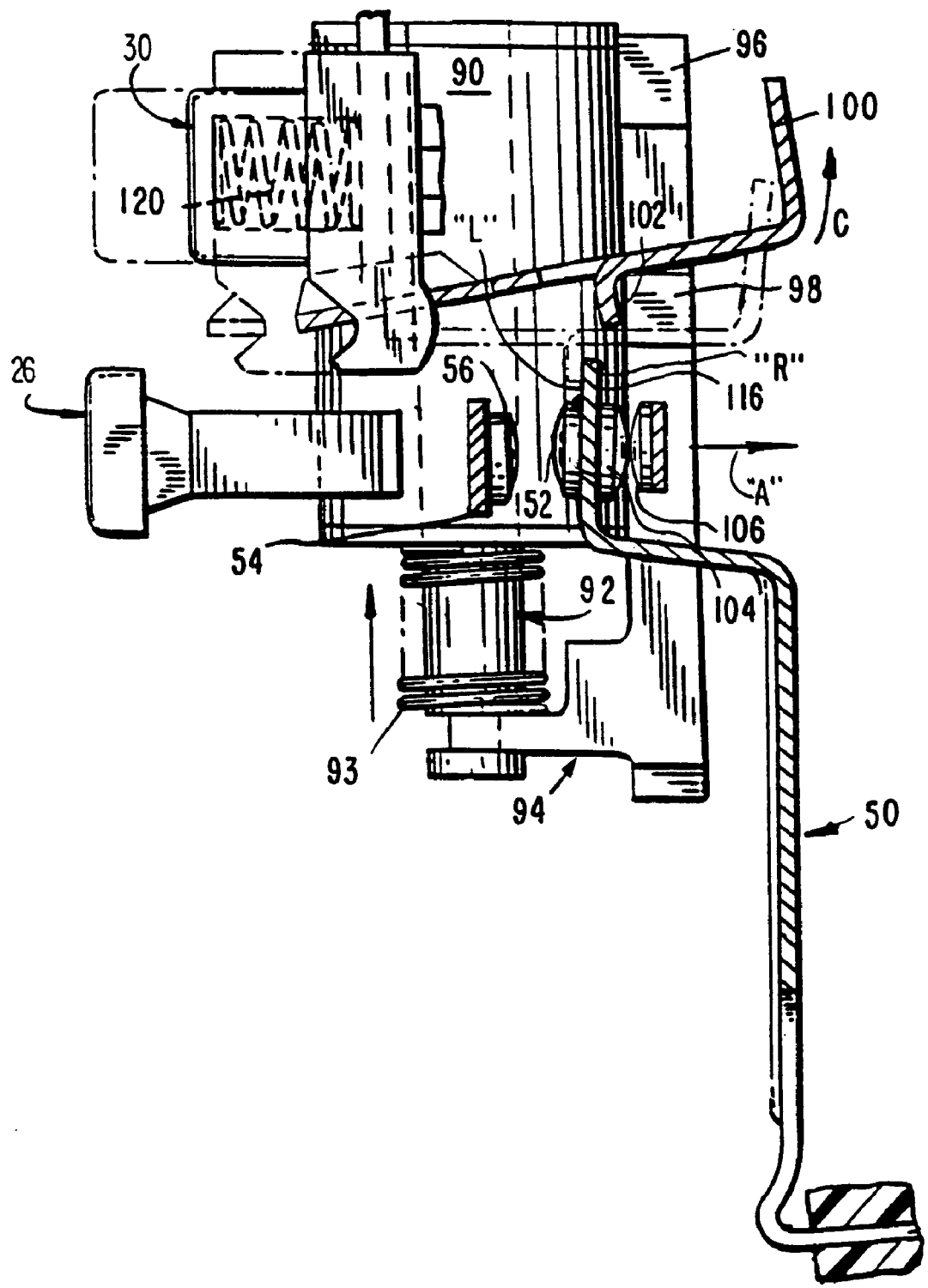
FIG. 8 is a side elevational view similar to FIG. 2, illustrating the components of the GFCI device during a reset operation.
Figure 11:
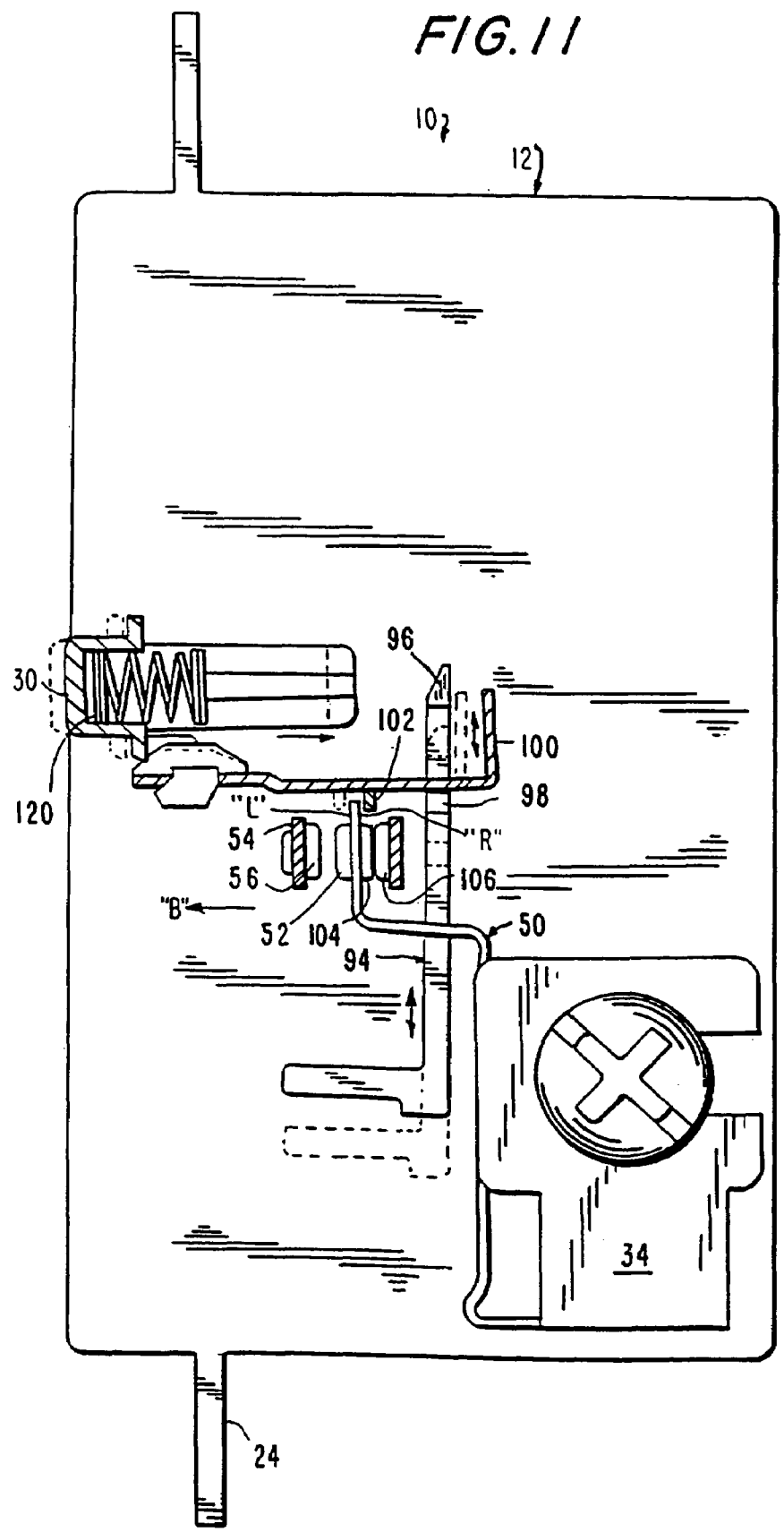

To reset the GFCI receptacle so that contacts 52 and 56 are closed and continuity in the phase conductive path is reestablished, the reset button 30 is depressed sufficiently to overcome the bias force of return spring 120 and move the latch member 100 in the direction of arrow A, seen in FIG. 8. While the reset button 30 is being depressed, latch finger 102 contacts side L of the movable contact arm 50 and continued depression of the reset button 30 forces the latch member to overcome the stress force exerted by the arm 50 causing the reset contact 104 on the arm 50 to close on reset contact 106. Closing the reset contacts activates the operation of the circuit interrupter by, for example simulating a fault, so that plunger 92 moves the banger 94 upwardly striking the latch member 100 which pivots the latch finger 102, while the latch member 100 continues to move in the direction of arrow A. As a result, the latch finger 102 is lifted over side L of the remote end 116 of the movable contact arm 50 onto side R of the remote end of the movable contact arm, as seen in FIGS. 7 and 11. Contact arm 50 returns to its unstressed position, opening contacts 52 and 56 and contacts 62 and 66, so as to terminate the activation of the circuit interrupting portion, thereby de-energizing the coil assembly 90.

Figure 9:
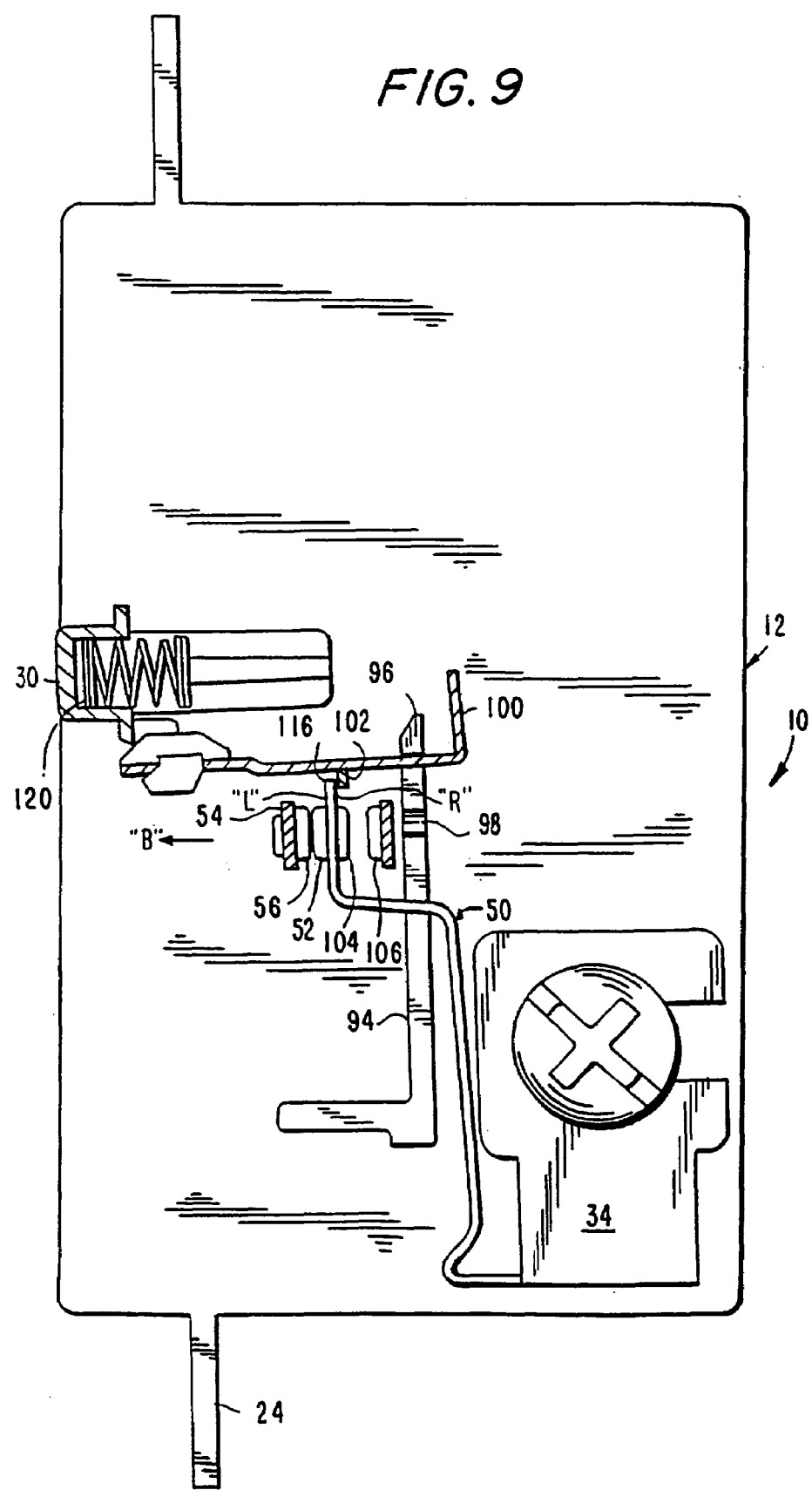
FIGS. 9–11 are schematic representations of the operation of one embodiment of the reset portion of the present application, illustrating a latching member used to make an electrical connection between line and load connections and to relate the reset portion of the electrical connection with the operation of the circuit interrupting portion.

After the circuit interrupter operation is activated, the coil assembly 90 is de-energized so that so that plunger 92 returns to its original extended position, and banger 94 releases the latch member 100 so that the latch finger 102 is in a reset position, seen din FIG. 9. Release of the reset button causes the latching member 100 and movable contact arm 50 to move in the direction of arrow B (seen in FIG. 9) until contact 52 electrically engages contact 56, as seen in FIG. 2.

As noted above, if opening and closing of electrical continuity in the neutral conductive path is desired, the above description for the phase conductive path is also applicable to the neutral conductive path.

In an alternative embodiment, the circuit interrupting devices may also include a trip portion that operates independently of the circuit interrupting portion so that in the event the circuit interrupting portion becomes non-operational the device can still be tripped. Preferably, the trip portion is manually activated and uses mechanical components to break one or more conductive paths. However, the trip portion may use electrical circuitry and/or electro-mechanical components to break either the phase or neutral conductive path or both paths.

For the purposes of the present application, the structure or mechanisms for this embodiment are also incorporated into a GFCI receptacle, seen in FIGS. 13–20, suitable for installation in a single-gang junction box in a home. However, the mechanisms according to the present application can be included in any of the various devices in the family of resettable circuit interrupting devices.

Figure 13:
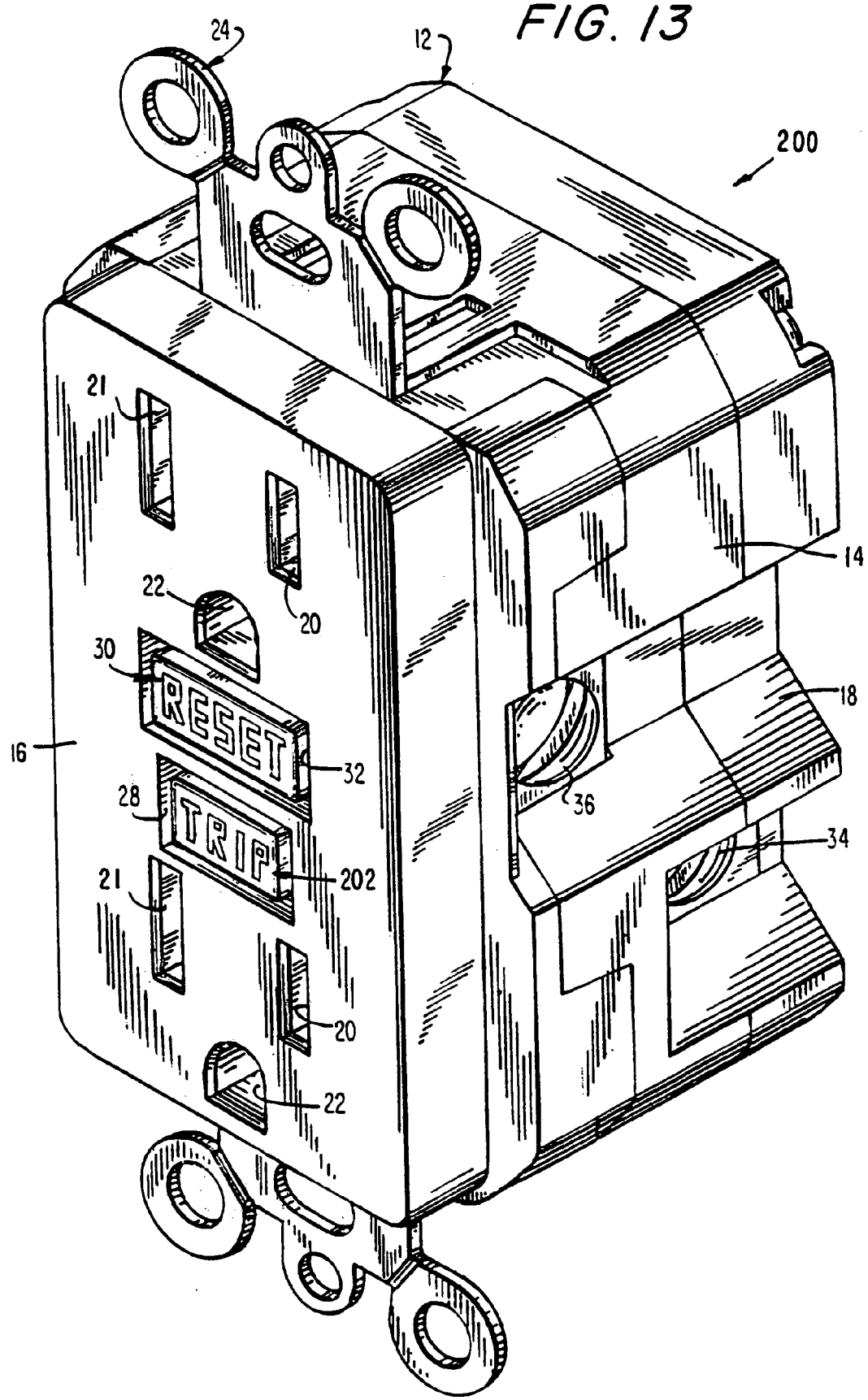
FIG. 13 is a perspective view of an alternative embodiment of a ground fault circuit interrupting device according to the present application.

Turning now to FIG. 13, the GFCI receptacle 200 according to this embodiment is similar to the GFCI receptacle described in FIGS. 1–12. Similar to FIG. 1, the GFCI receptacle 200 has a housing 12 consisting of a relatively central body 14 to which a face or cover portion 16 and a rear portion 18 are, preferably, removably secured.

A trip actuator 202, preferably a button, which is part of the trip portion to be described in more detail below, extends through opening 28 in the face portion 16 of the housing 12. The trip actuator is used, in this exemplary embodiment, to mechanically trip the GFCI receptacle, i.e., break electrical continuity in one or more of the conductive paths, independent of the operation of the circuit interrupting portion.

A reset actuator 30, preferably a button, which is part of the reset portion, extends through opening 32 in the face portion 16 of the housing 12. The reset button is used to activate the reset operation, which reestablishes electrical continuity in the open conductive paths, i.e., resets the device, if the circuit interrupting portion is operational.

As in the above embodiment, electrical connections to existing household electrical wiring are made via binding screws 34 and 36, where screw 34 is an input (or line) phase connection, and screw 36 is an output (or load) phase connection. It should be noted that two additional binding screws 38 and 40 (seen in FIG. 3) are located on the opposite side of the receptacle 200. These additional binding screws provide line and load neutral connections, respectively. A more detailed description of a GFCI receptacle is provided in U.S. Pat. No. 4,595,894, which is incorporated herein in its entirety by reference.

Referring to FIGS. 4–6, 14 and 17, the conductive paths in this embodiment are substantially the same as those described above. The conductive path between the line phase connection 34 and the load phase connection 36 includes, contact arm 50 which is movable between stressed and unstressed positions, movable contact 52 mounted to the contact arm 50, contact arm 54 secured to or monolithically formed into the load phase connection 36 and fixed contact 56 mounted to the contact arm 54 (seen in FIGS. 4, 5 and 17). The user accessible load phase connection for this embodiment includes terminal assembly 58 having two binding terminals 60 which are capable of engaging a prong of a male plug inserted therebetween. The conductive path between the line phase connection 34 and the user accessible load phase connection includes, contact arm 50, movable contact 62 mounted to contact arm 50, contact arm 64 secured to or monolithically formed into terminal assembly 58, and fixed contact 66 mounted to contact arm 64. These conductive paths are collectively called the phase conductive path.

Figure 4:
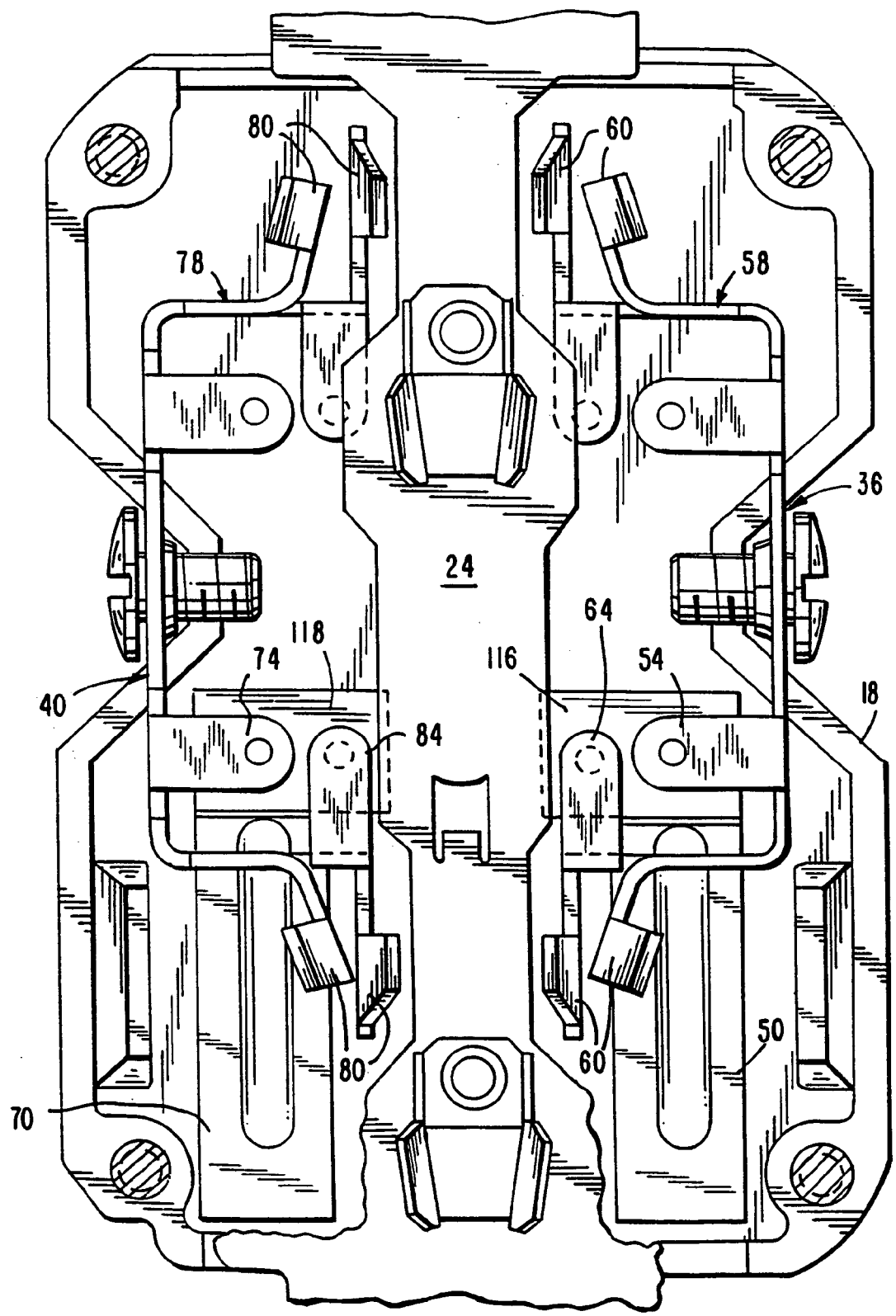
FIG. 4 is a plan view of portions of electrical conductive paths located within the GFCI device of FIG. 1.
Figure 5:
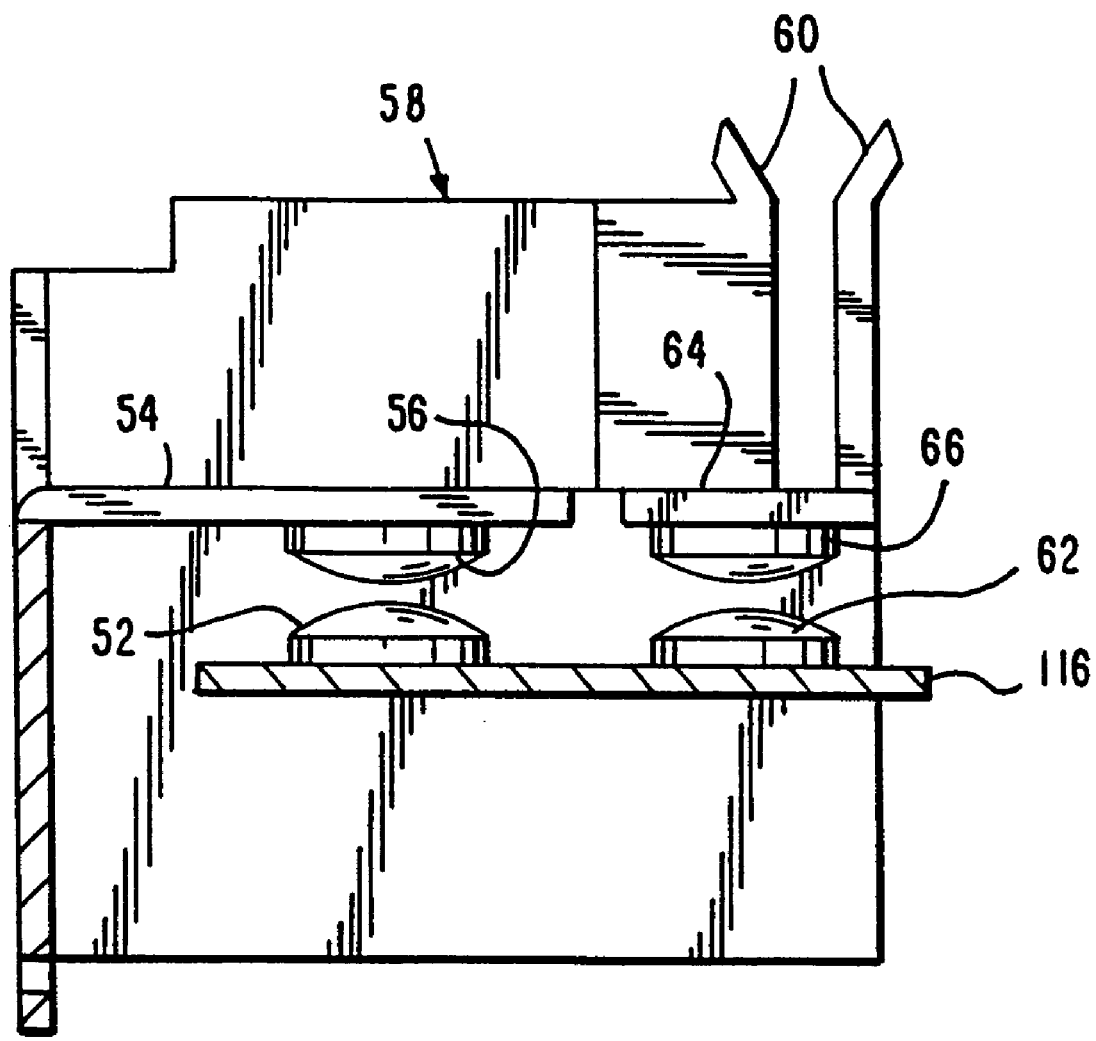
FIG. 5 is a partial sectional view of a portion of a conductive path shown in FIG. 4.
Figure 6:
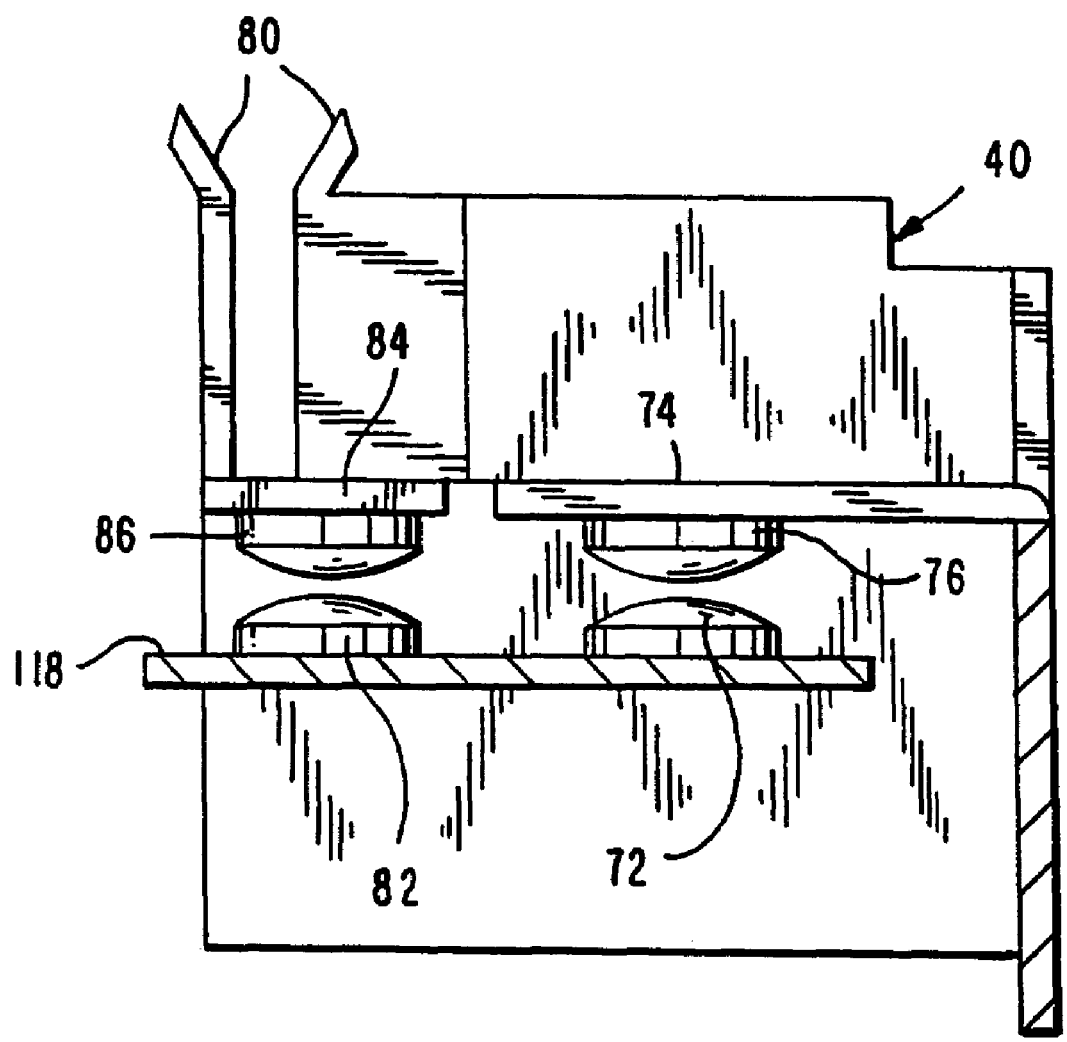
FIG. 6 is a partial sectional view of a portion of a conductive path shown in FIG. 4.
Figure 17:
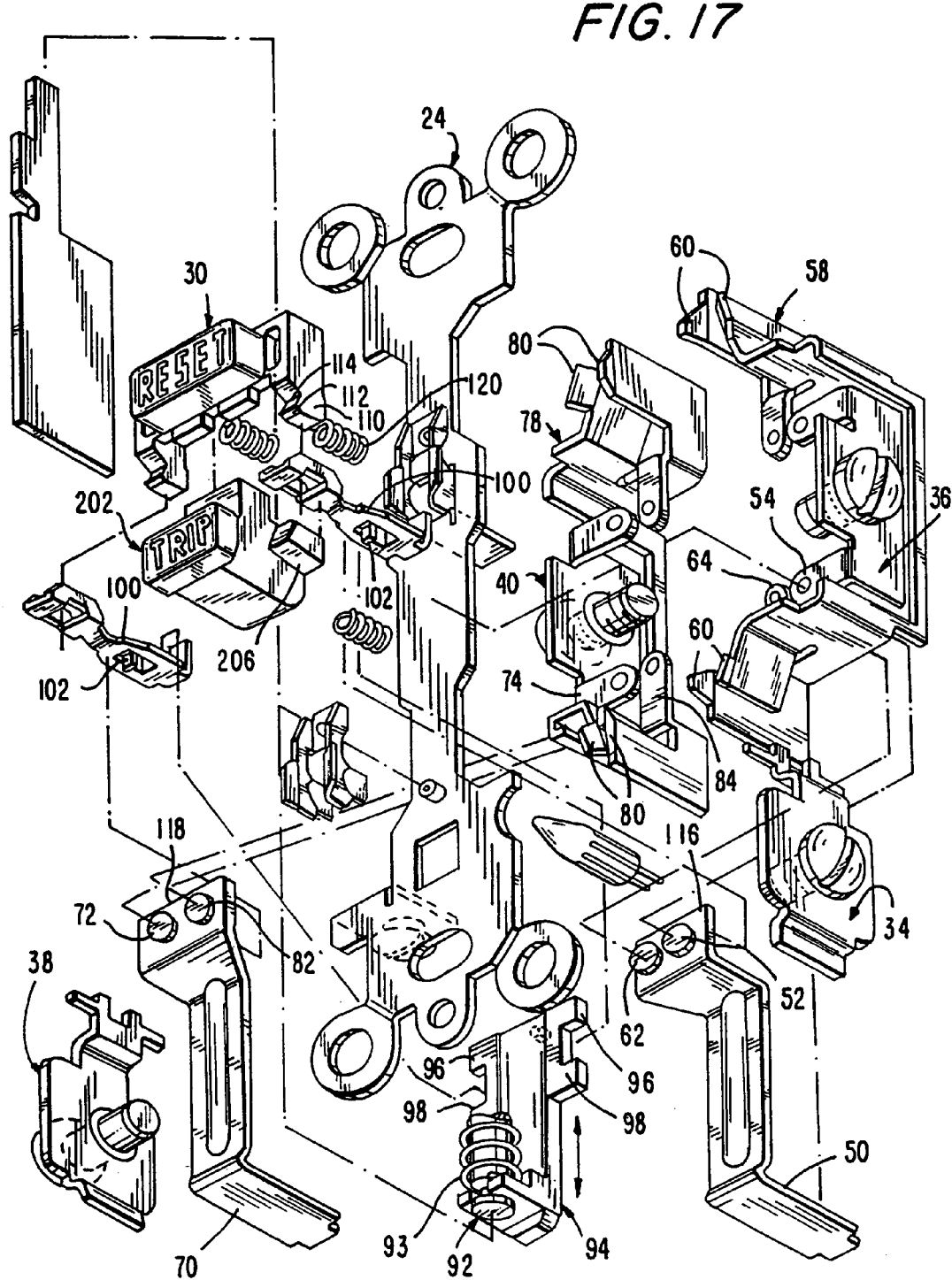
FIG. 17 is an exploded view of internal components of the GFCI device of FIG. 13.

Similarly, the conductive path between the line neutral connection 38 and the load neutral connection 40 includes, contact arm 70 which is movable between stressed and unstressed positions, movable contact 72 mounted to contact arm 70, contact arm 74 secured to or monolithically formed into load neutral connection 40, and fixed contact 76 mounted to the contact arm 74 (seen in FIGS. 4, 6 and 17). The user accessible load neutral connection for this embodiment includes terminal assembly 78 having two binding terminals 80 which are capable of engaging a prong of a male plug inserted therebetween. The conductive path between the line neutral connection 38 and the user accessible load neutral connection includes, contact arm 70, movable contact 82 mounted to the contact arm 70, contact arm 84 secured to or monolithically formed into terminal assembly 78, and fixed contact 86 mounted to contact arm 84. These conductive paths are collectively called the neutral conductive path.

Figure 14:
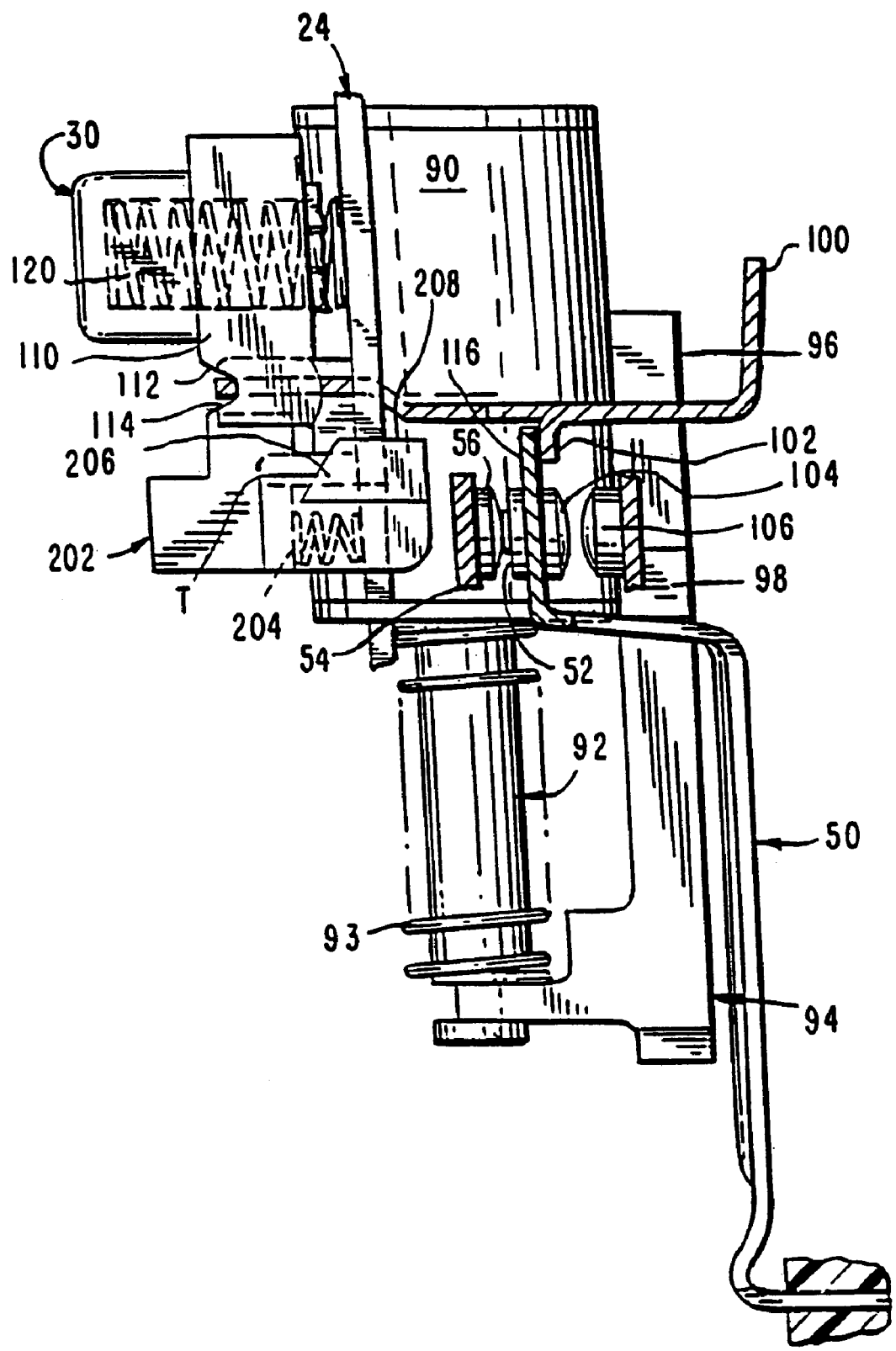
FIG. 14 is side elevational view, partly in section, of a portion of the GFCI device shown in FIG. 13, illustrating the GFCI device in a set or circuit making position.

There is also shown in FIG. 14, mechanical components used during circuit interrupting and reset operations according to this embodiment of the present application. Although these components shown in the drawings are electro-mechanical in nature, the present application also contemplates using semiconductor type circuit interrupting and reset components, as well as other mechanisms capable of making and breaking electrical continuity.

The circuit interrupting device according to this embodiment incorporates an independent trip portion into the circuit interrupting device of FIGS. 1–12. Therefore, a description of the circuit interrupting, reset and reset lockout portions are omitted.

Figure 15:
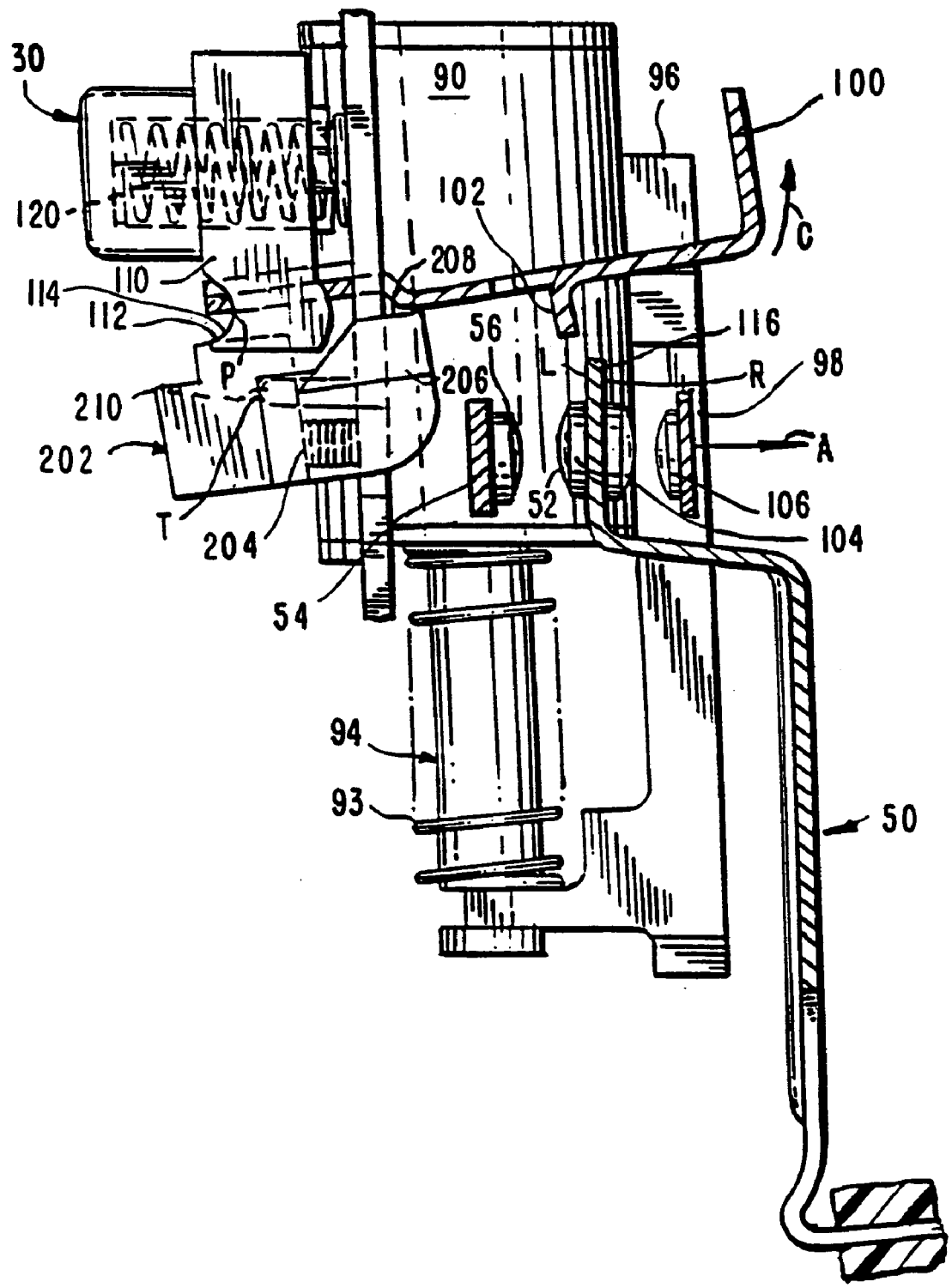
FIG. 15 is a side elevational view similar to FIG. 14, illustrating the GFCI device in a circuit breaking position.
Figure 16:
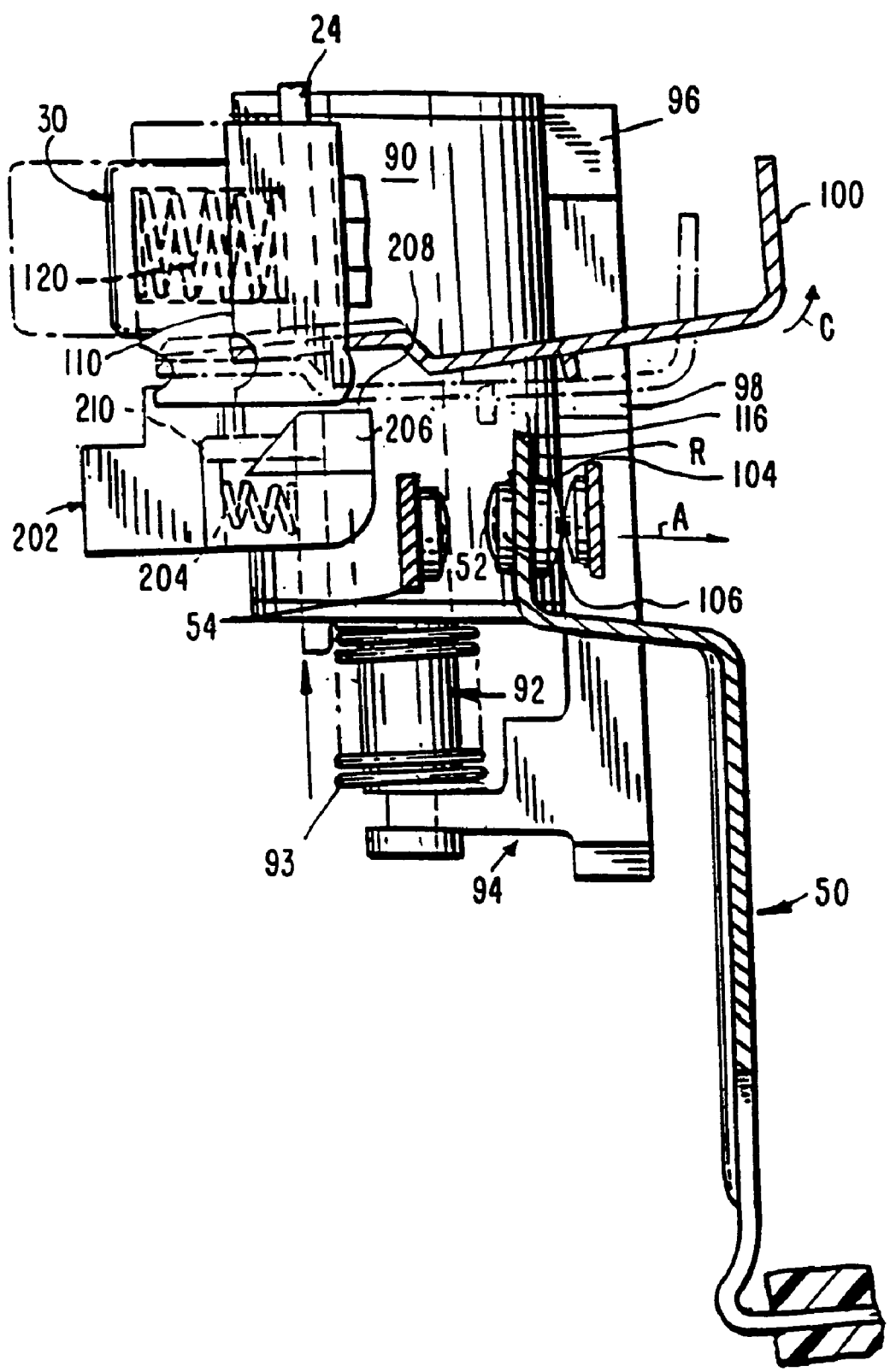
FIG. 16 is a side elevational view similar to FIG. 14, illustrating the components of the GFCI device during a reset operation.

Referring to FIGS. 14–16 an exemplary embodiment of the trip portion according to the present application includes a trip actuator 202, preferably a button, that is movable between a set position, where contacts 52 and 56 are permitted to close or make contact, as seen in FIG. 14, and a trip position where contacts 52 and 56 are caused to open, as seen in FIG. 15. Spring 204 normally biases trip actuator 202 toward the set position. The trip portion also includes a trip arm 206 that extends from the trip actuator 202 so that a surface 208 of the trip arm 206 moves into contact with the movable latching member 100, when the trip button is moved toward the trip position. When the trip actuator 202 is in the set position, surface 208 of trip arm 202 can be in contact with or close proximity to the movable latching member 100, as seen in FIG. 14.

Figure 18:
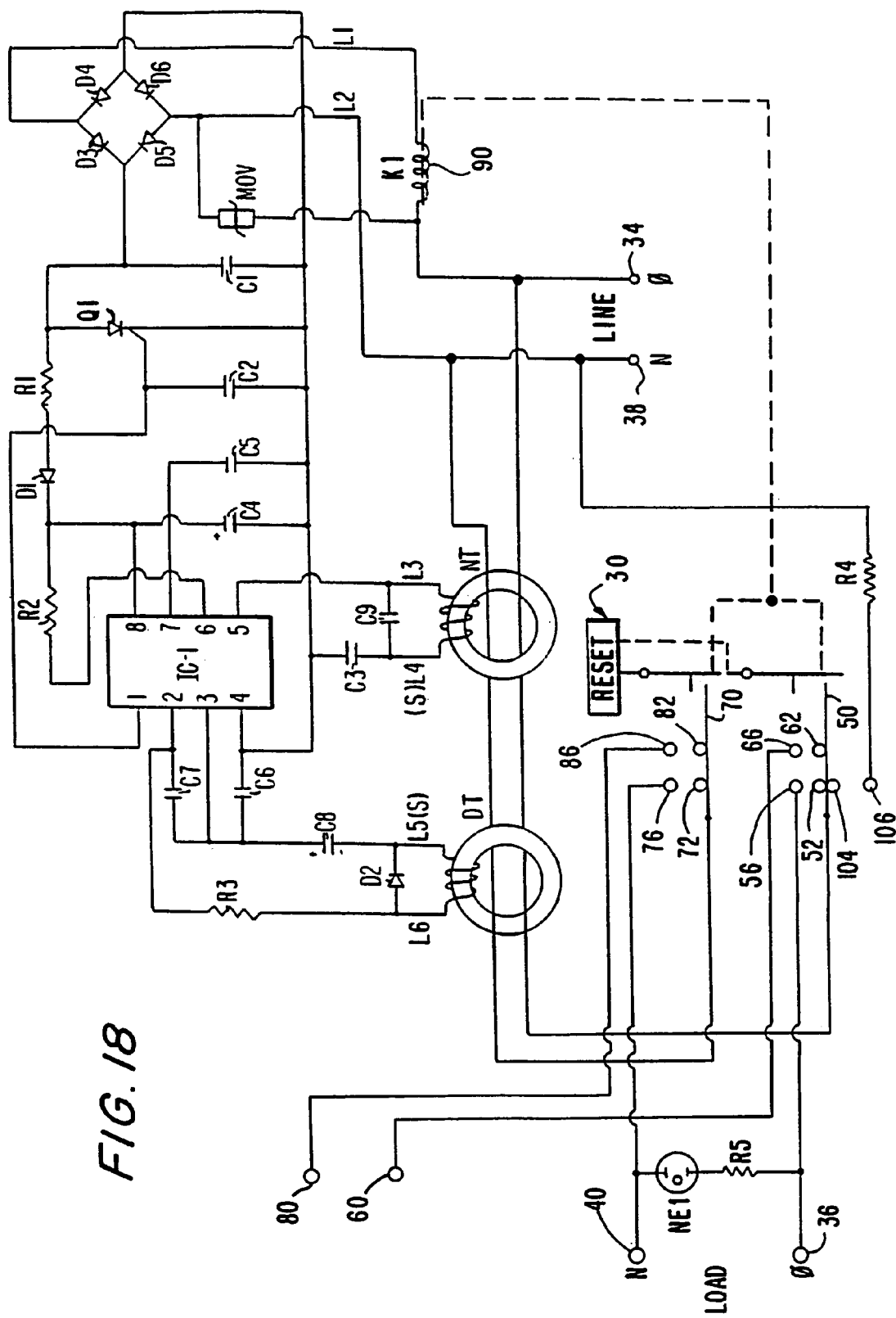
FIG. 18 is a schematic diagram of a circuit for detecting ground faults and resetting the GFCI device of FIG. 13.

In operation, upon depression of the trip actuator 202, the trip actuator pivots about point T of pivot arm 210 (seen in FIG. 15) extending from strap 24 so that the surface 208 of the trip arm 206 can contact the movable latching member 100. As the trip actuator 202 is moved toward the trip position, trip arm 206 also enters the path of movement of the finger 110 associated with reset button 30 thus blocking the finger 102 from further movement in the direction of arrow A (seen in FIG. 15). By blocking the movement of the finger 110, the trip arm 206 inhibits the activation of the reset operation and, thus, inhibits simultaneous activation of the trip and reset operations. Further depression of the trip actuator 202 causes the movable latching member 100 to pivot about point T in the direction of arrow C (seen in FIG. 15). Pivotal movement of the latching member 100 causes latching finger 102 of latching arm 100 to move out of contact with the movable contact arm 50 so that the arm 50 returns to its unstressed condition, and the conductive path is broken. Resetting of the device is achieved as described above. An exemplary embodiment of the circuitry used to sense faults and reset the conductive paths, is shown in FIG. 18.

As noted above, if opening and closing of electrical continuity in the neutral conductive path is desired, the above description for the phase conductive path is also applicable to the neutral conductive path.

Figure 19:
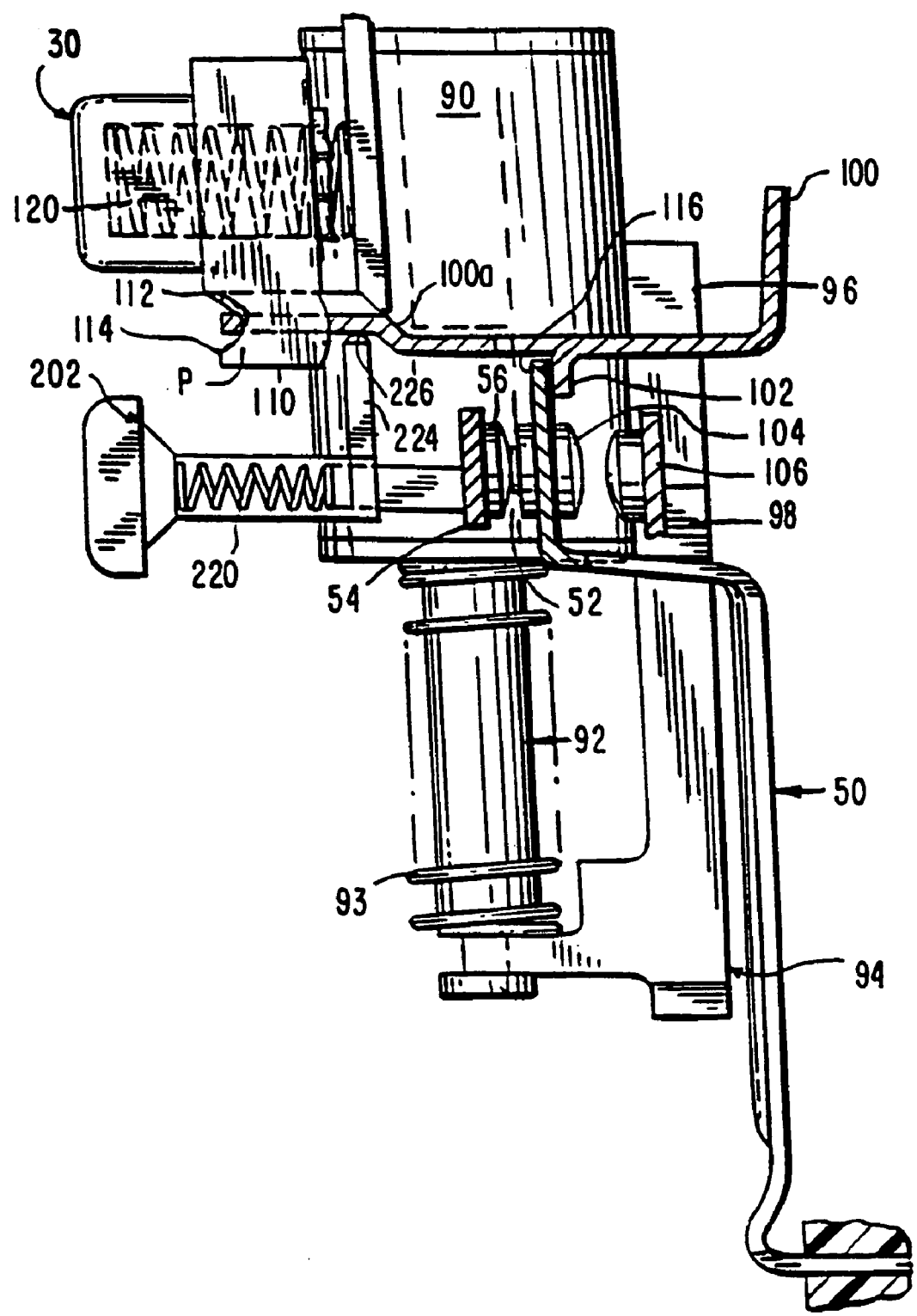
FIG. 19 is side elevational view, partly in section, of components of a portion of the alternative embodiment of the GFCI device shown in FIG. 13, illustrating the device in a set or circuit making position.
Figure 20:
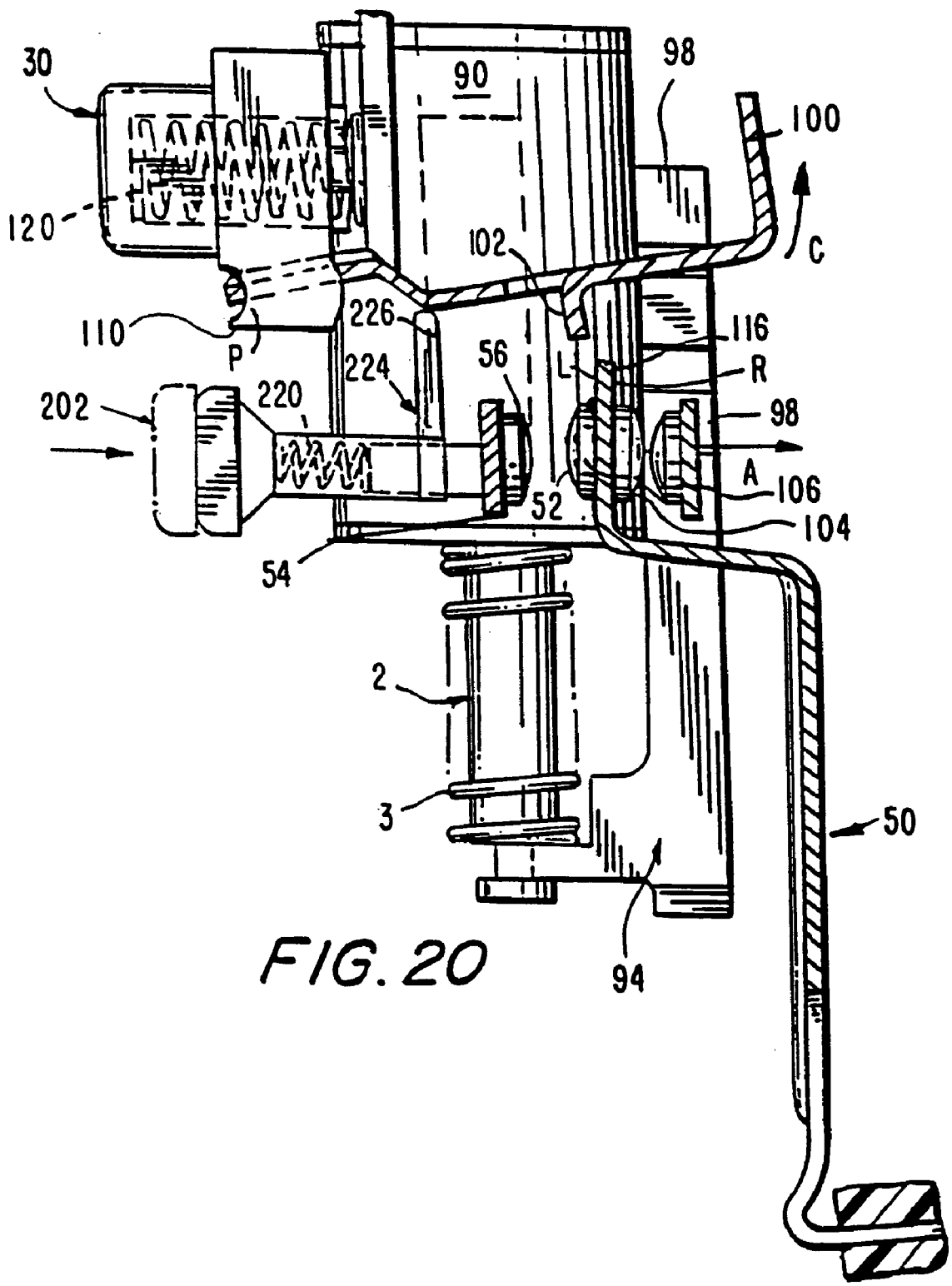
FIG. 20 is a side elevational view similar to FIG. 19, illustrating of the device in a circuit breaking position.

An alternative embodiment of the trip portion will be described with reference to FIGS. 19 and 20. In this embodiment, the trip portion includes a trip actuator 202 that at is movable between a set position, where contacts 52 and 56 are permitted to close or make contact, as seen in FIG. 19, and a trip position where contacts 52 and 56 are caused to open, as seen in FIG. 20. Spring 220 normally biases trip actuator 202 toward the set position. The trip portion also includes a trip arm 224 that extends from the trip actuator 202 so that a distal end 226 of the trip arm is in movable contact with the movable latching member 100. As noted above, the movable latching member 100 is, in this embodiment, common to the trip, circuit interrupting, reset and reset lockout portions and is used to make, break or lockout the electrical connections in the phase and/or neutral conductive paths.

In this embodiment, the movable latching member 100 includes a ramped portion 100a which facilitates opening and closing of electrical contacts 52 and 56 when the trip actuator 202 is moved between the set and trip positions, respectively. To illustrate, when the trip actuator 202 is in the set position, distal end 226 of trip arm 224 contacts the upper side of the ramped portion 100a, seen in FIG. 19. When the trip actuator 202 is depressed, the distal end 226 of the trip arm 224 moves along the ramp and pivots the latching member 60 about point P in the direction of arrow C causing latching finger 102 of the latching member 100 to move out of contact with the movable contact arm 50 so that the arm 50 returns to its unstressed condition, and the conductive path is broken. Resetting of the device is achieved as described above.

Figure 21:
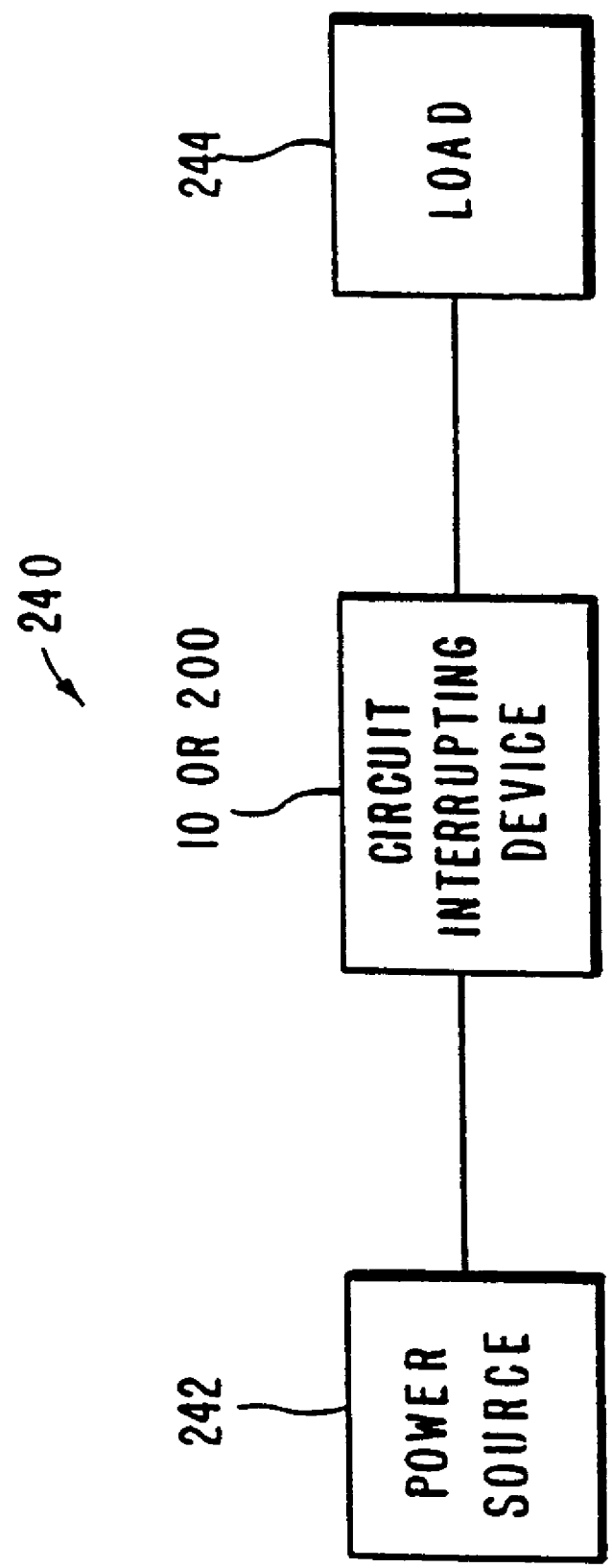
FIG. 21 is a block diagram of a circuit interrupting system according to the present application.

The circuit interrupting device according to the present application can be used in electrical systems, shown in the exemplary block diagram of FIG. 21. The system 240 includes a source of power 242, such as ac power in a home, at least one circuit interrupting device, e.g., circuit interrupting device 10 or 200, electrically connected to the power source, and one or more loads 244 connected to the circuit interrupting device. As an example of one such system, ac power supplied to single gang junction box in a home may be connected to a GFCI receptacle having one of the above described reverse wiring fault protection, independent trip or reset lockout features, or any combination of these features may be combined into the circuit interrupting device. Household appliances that are then plugged into the receptacle become the load or loads of the system.

Figure 22:
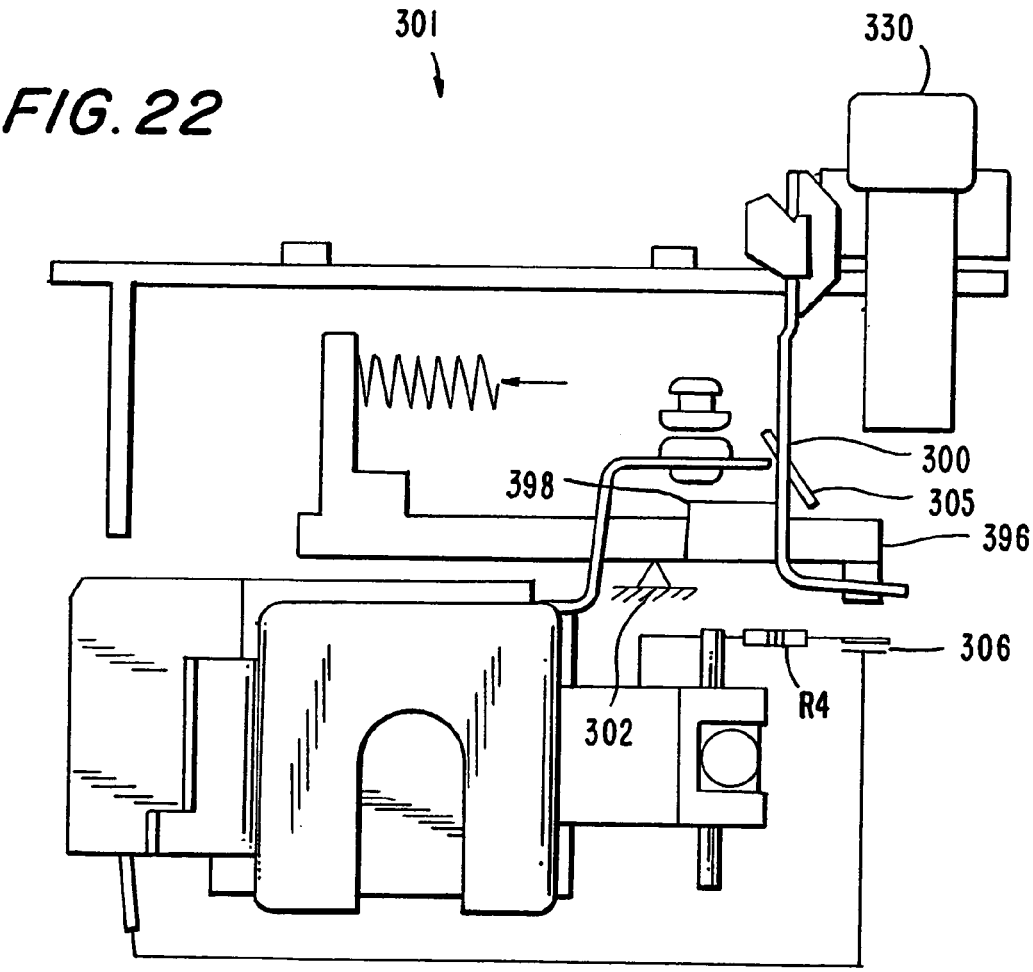
FIG. 22 is a partial side cutaway view of a GFCI similar to the device of FIG. 1 according to another embodiment of the present application.
Figure 23A:
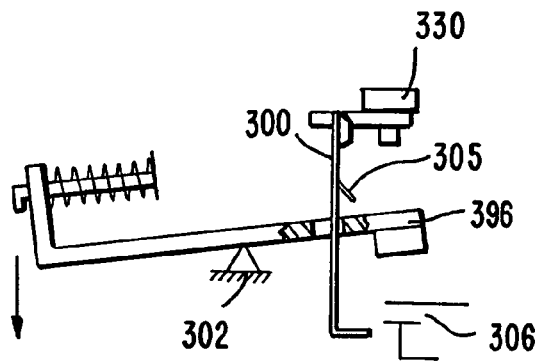
FIG. 23a is a partial side cutaway view of a GFCI similar to the device of FIG. 1 according to another embodiment of the present application.
Figure 23B:
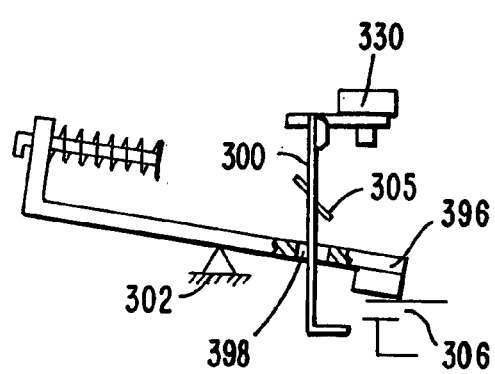
FIG. 23b is a partial side cutaway view of a GFCI similar to the device of FIG. 1 according to another embodiment of the present application.

With reference to FIGS. 22, 23a and 23b, another embodiment of the present invention is described. The GFCI 300 of this embodiment is similar to the device of FIGS. 1–12 and only the differences are explained. With reference to FIG. 22, GFCI 300 has a reset button 330, reset latch 300 and a lockout arm 305. A test switch 306 that is not in the same location as the previously described device will connect R4 in to the test circuit when banger 396 pivots about pivot point 302.

With reference to FIGS. 23a and 23b, operation of the reset lockout is described. When the GFCI 301 is in the tripped state (off), the reset button 330 is in its uppermost position. When a user begins to depress the reset button 330, the reset latch 300 will begin downward and lockout arm will force the banger 396 down until it closes switch 306. If the test passes and the solenoid fires, the banger will pass lockout arm 305 and allow the device to reset. Otherwise, the lockout arm 305 will prevent the reset of the device 301.

Figure 24:
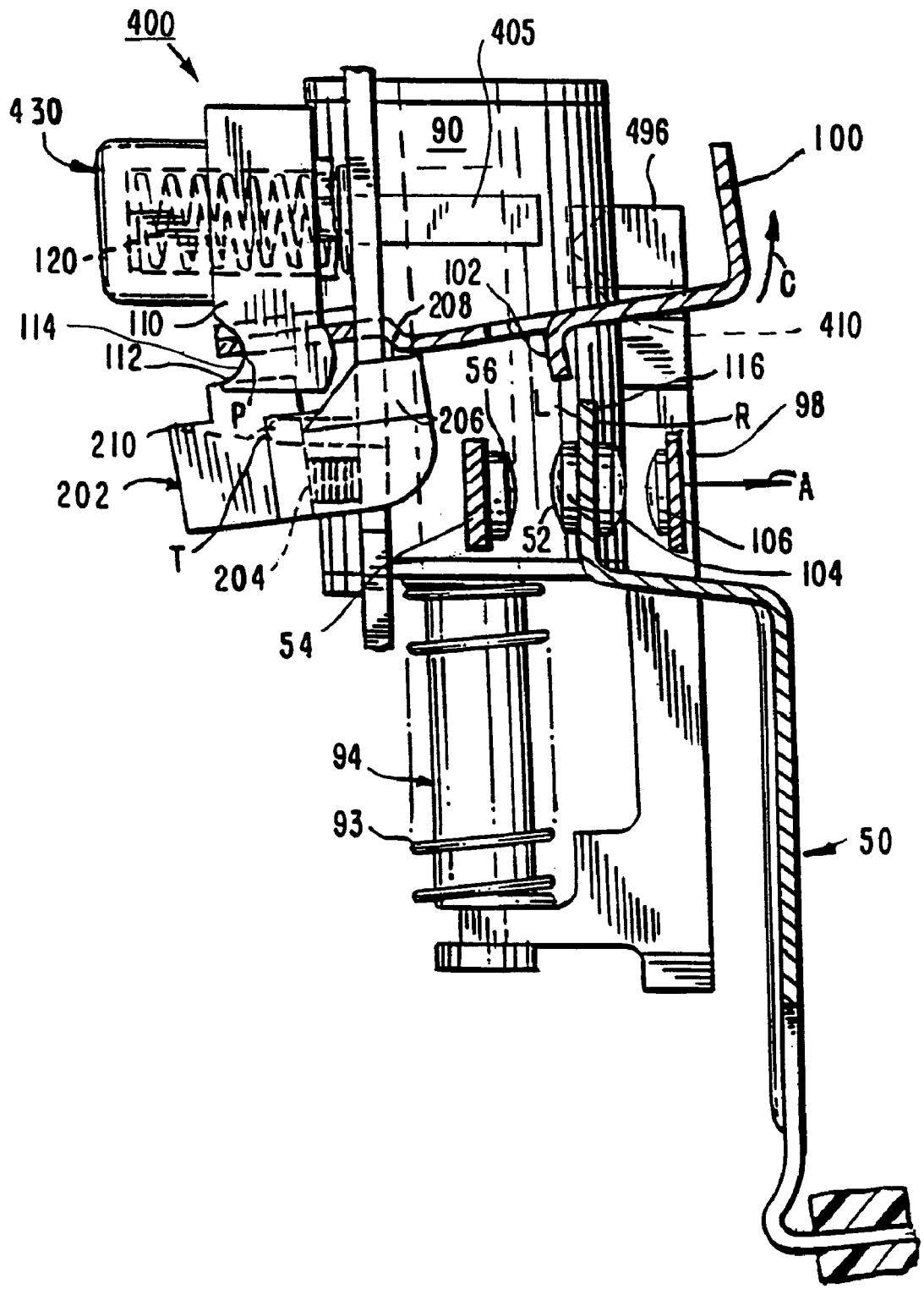
FIG. 24 is a side elevational view similar to FIG. 15, illustrating another embodiment of the GFCI.

Referring to FIGS. 24, 25a, 25b, 26a, 26b, 27a and 27b another embodiment of a GFCI according to the present application is described. Referring to FIG. 24, the GFCI 400 has a reset button 430 with rest button legs 405. The banger 496 has ribs 497 and a reset lockout wire 430 having an end 431 attached to the banger 496. Referring to FIGS. 25a and b, a reset lockout groove is created in the bottom of the housing 440. The banger ribs 497 perform a lockout function because wire 430 prevents the banger 496 from retracting all the way when the wire is in position B, the lockout position. Thus the ribs prevent the reset button from being depressed.

The operation is as follows. When going to the trip state, the banger 496 moves, and wire 430 causes wire tip 431 to travel in the groove 442 in a path from point A to B and eventually to C where it comes to a lockout state. In this position, banger 496 is initially up and ribs 497 block reset button 430 from resetting the device 400. To unlock the device, an electrical test is performed, preferably by the user pressing the test button (not shown). The solenoid (not shown) fires and housing portion 445 causes the wire tip 431 to travel from position C through the groove 422 to position D and eventually E, where the device can be reset because banger ribs 497 are no longer interfering with reset button legs 405. Accordingly, the device 400 is reset and may supply power. Accordingly, the wire 430 is added to the banger 496. The housing mould may be configured with portions 440, 460, 445, 443 and 450. As can be appreciated from FIG. 25a, housing portion 450 assures that the wire tip 431 first takes the path to the left. A ramp 443 may provide a one-way lock in the groove 442 such that the wire tip passes over ramp 443 near position B and will not retrace its path but go to position C. A notch on housing piortion 445 may ensure that when the solenoid (not shown) fires, the wire tip 431 will travel from position C to D and eventually E. Accordingly, a "detent" or "catch and latch" action, similar to that of a push button pen is employed. Once the solenoid (not shown) fires, the banger 496 would be locked into a forward position. Two ribs 497 added to the end of the banger 496 act as stops, preventing the reset button from being able to move to a downward position, thus locking out the reset button as shown in FIGS. 26a–b. In order to reset the device 400, the solenoid would have to fire, unlocking the banger 496 from its forward position. When the banger 496 returns to its backward position, the reset button is free to move down. As can be appreciated, to reset the device 400 of the present embodiment, the test button must be pressed first. If the device test succeeds (solenoid fires), the device will be able to reset.

As noted, although the components used during circuit interrupting and device reset operations are electro-mechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed is:

1. A ground fault circuit interrupter having a set of contacts adapted to assume a conducting state and a tripped state in a housing comprising:
   a spring loaded reset button coupled to move into said housing when pressed, a contact arm located within said housing coupled to one of said contacts to assume a stressed position when said set of contacts are in said conducting state and an unstressed position when said contacts are in said tripped state;

a latching member coupled to swing from a pivot which moves with said reset button to engage and hold said contact arm in said stressed position when the contacts are in said conducting state;

an electro-mechanical actuator coupled to be energized by depressing said reset button to move from a first not energized position to a second energized position and then back to said first not energized position to cause said latching member to pivot first out of engagement with the contact arm and then pivot back to again engage the latching member to position and hold the contact arm in its stressed position;

a stop member coupled to lock said actuator in its second position; and a protrusion coupled to said actuator to prevent said reset button from energizing said electro-mechanical actuator by blocking said reset button from being pushed into said housing.

2. The ground fault circuit interrupter of claim 1 wherein said reset button has a leg which cooperates with said protrusion coupled to said actuator to prevent said reset button from resetting said ground fault circuit interrupter when said actuator is being held in its second position by said stop member.

3. The ground fault circuit interrupter of claim 2 wherein said stop member comprises locking apparatus which, when said electro-mechanical actuator is driven to its second position, locks said actuator to said second position and, when said electro-mechanical actuator is again energized, unlocks said actuator to allow it to return to its first position.

4. The ground fault circuit interrupter of claim 3 further comprising a test button coupled to move into said housing when pressed to activate said electro-mechanical actuator to unlock said actuator.

* * * * *

UNITED STATES PATENT AND TRADEMARK OFFICE
CERTIFICATE OF CORRECTION

| | | |
|---|---|---|
| PATENT NO. | : 7,365,621 B2 | Page 1 of 1 |
| APPLICATION NO. | : 10/909610 | |
| DATED | : April 29, 2008 | |
| INVENTOR(S) | : Frantz Germain et al. | |

It is certified that error appears in the above-identified patent and that said Letters Patent is hereby corrected as shown below:

On the title page, item [63]:

"Continuation of application No. 09/813,412, filed on Mar. 21, 2001, now Pat. No. 6,771,152, which is a continuation-in-part of application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967, application No. 10/909,610, which is a continuation-in-part of application No. 09/688,481, filed on Oct. 16, 2000, now Pat. No. 6,437,700." should be, -- Continuation of application No. 09/813,412, filed on Mar. 21, 2001, now Pat. No. 6,771,152. Related to application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967. --

Signed and Sealed this

Fifth Day of January, 2010

David J. Kappos
*Director of the United States Patent and Trademark Office*